US010223685B2

(12) United States Patent  
Cole

(10) Patent No.: US 10,223,685 B2  
(45) Date of Patent: Mar. 5, 2019

(54) SYSTEMS, METHODS, AND MEDIA FOR PAY-PER-ACCESS MICROPAYMENT-BASED WEB BROWSING AND SERVER APPLICATIONS

(71) Applicant: ARITHMETIC OPERATIONS INCORPORATED, Austin, TX (US)

(72) Inventor: Philip Edward Cole, Austin, TX (US)

(73) Assignee: ARITHMETIC OPERATIONS INCORPORATED, Austin, TX (US)

( * ) Notice: Subject to any disclaimer, the term of this patent is extended or adjusted under 35 U.S.C. 154(b) by 0 days.

(21) Appl. No.: 15/372,129

(22) Filed: Dec. 7, 2016

(65) Prior Publication Data

US 2017/0249623 A1 Aug. 31, 2017

Related U.S. Application Data

(60) Provisional application No. 62/300,458, filed on Feb. 26, 2016.

(51) Int. Cl.
  *G06Q 20/08* (2012.01)
  *G06Q 20/12* (2012.01)
  *G06Q 20/22* (2012.01)
  *G06Q 30/02* (2012.01)

(52) U.S. Cl.
  CPC .......... *G06Q 20/29* (2013.01); *G06Q 20/085* (2013.01); *G06Q 20/123* (2013.01); *G06Q 30/0273* (2013.01); *G06Q 30/0277* (2013.01)

(58) Field of Classification Search
  CPC ................... G06Q 30/0207–30/0284
  USPC ............................. 705/14.1–14.73
  See application file for complete search history.

(56) References Cited

U.S. PATENT DOCUMENTS

| | | | |
|---|---|---|---|
| 5,974,398 A * | 10/1999 | Hanson | G06Q 30/02 379/88.2 |
| 8,392,242 B1 * | 3/2013 | Utter | G06Q 10/101 705/14.49 |
| RE46,092 E * | 8/2016 | Redlich | G06Q 30/0274 |
| 2002/0111907 A1 * | 8/2002 | Ling | G06Q 20/04 705/41 |
| 2003/0023549 A1 * | 1/2003 | Armes | G06Q 20/02 705/40 |

(Continued)

FOREIGN PATENT DOCUMENTS

WO   WO-2006113834 A2 * 10/2006 ............. G06F 21/10

OTHER PUBLICATIONS

Back et al. Enabling Blockchain Innovations with Pegged Sidechains. Available at https://blockstream.com/technology/sidechains.pdf (25 pgs.) (2014).
Brave Software. Browse faster and safer with Brave (webpage). Available at https://brave.com (5 pgs.) (Accessed 2017).
Brown. Thoughts on the future of finance. A simple explanation of Bitcoin "Sidechains". Available at http://gendal.me/2014/10/26/a-simple-explanation-of-bitcoin-sidechains/ (6 pgs.) (2016).

(Continued)

*Primary Examiner* — John Van Bramer
(74) *Attorney, Agent, or Firm* — Wilson Sonsini Goodrich & Rosati

(57) ABSTRACT

Disclosed are systems, media, and methods for providing pay-per-access micropayment-based web browsing and server applications. In one aspect, disclosed herein are computer-implemented systems comprising a digital processing device comprising at least one processor, an operating system configured to perform executable instructions, a memory, and a computer program including instructions executable by the digital processing device to create a pay-per-access micropayment-based server application.

28 Claims, 10 Drawing Sheets

(56) References Cited

U.S. PATENT DOCUMENTS

| | | | | |
|---|---|---|---|---|
| 2007/0274490 A1* | 11/2007 | Hu | ............... | H04L 12/14 |
| | | | | 379/201.01 |
| 2009/0063491 A1* | 3/2009 | Barclay | ............... | G06Q 30/02 |
| 2011/0077949 A1* | 3/2011 | Olliphant | ............... | G06Q 20/10 |
| | | | | 705/1.1 |
| 2012/0036044 A1* | 2/2012 | Omidyar | ............... | G06Q 20/02 |
| | | | | 705/26.41 |
| 2013/0185198 A1* | 7/2013 | Lorch | ............... | G06Q 20/29 |
| | | | | 705/39 |
| 2014/0143035 A1* | 5/2014 | Reardon | ............... | G06Q 20/10 |
| | | | | 705/14.11 |
| 2015/0262151 A1* | 9/2015 | Enzminger | ............... | G06Q 30/06 |
| | | | | 705/26.1 |
| 2015/0379510 A1* | 12/2015 | Smith | ............... | G06Q 20/3829 |
| | | | | 705/71 |

OTHER PUBLICATIONS

CapGemini Focus E-zine publication. Micropayments: Is the Nickel-and-Dime Approach Gaining Currency? (3 pgs.) (2004).

Lightning Network. Scalable, Instant Bitcoin/Blockchang transactions. Available at https://Lightning.Network (3 pgs.) (Accessed 2017).

Stands. Welcome to a Better Web (webpage). Available at http://www.standsapp.org/ (3 pgs.) (Accessed 2017).

Szabo. Micropayments and mental transaction costs. 2nd Berlin Internet Economics Workshop (14 pgs) (1999).

Szabo. The Mental Accounting Barrier to Micropayments. Nick Szabo's Essays and Concise Tuturials (4 pgs.) (1996).

\* cited by examiner

SYSTEMS, METHODS, AND MEDIA FOR PAY-PER-ACCESS MICROPAYMENT-BASED WEB BROWSING AND SERVER APPLICATIONS

CROSS-REFERENCE TO RELATED APPLICATIONS

This application claims the benefit of U.S. Application Ser. No. 62/300,458, filed Feb. 26, 2016, which is hereby incorporated by reference in its entirety.

BACKGROUND OF THE INVENTION

Advertising pays a large portion of the costs associated with the Internet. Typically, a content publisher receives revenue from an advertiser by including advertisements along with content provided to the browser-user when the browser-user requests a web page. Some publishers serve the advertisements from their own servers along with the content the browser-user requested. Other publishers rely on third-party ad servers by placing particular tags or scripts into the content sent to the browser-user. The browser-user interprets those tags or scripts as instructions to retrieve advertising information from the third-party ad server. The advertising information is presented to the browser-user along with the publisher's content. Though various methods are employed, the base model is that advertisers pay publishers for each ad that is requested by a browser-user on the basis of the tags or scripts within that publisher's content page.

An AD BLOCKER commonly inspects the material coming from a publisher, identifies tags or scripts that would cause advertising to appear along with the content, and instructs the browser to ignore or suppress those tags or scripts. Use of an Ad Blocker disrupts the advertising-pays funding model for the Internet. When only a few browser-users were blocking ads, the effect was minimal. But when large numbers of browser-users began to block ads, the publishers' revenue was threatened. Some publishers responded to Ad Blockers by changing their published documents to inspect the browser-user for evidence of ad blocking capability. Thus began a cat-and-mouse game of detection and counter-detection. By inserting their own scripts as part of the content of a page served to the browser-user, the publisher conditioned delivery of content on "well-behaved" browser-user configurations. When the publisher script detected the presence of ad-blocking capability, it refused to serve the content requested by the browser-user. The Ad Blockers responded by altering their methods to avoid detection by the publisher-advertiser scripts. The publishers responded by adapting to the new methods employed by the Ad Blockers. This cycle has repeated multiple times in the last few years. In one famous (or notorious) episode, the Springer publishing house in Germany announced triumphantly that it had circumvented existing ad blocking technology, only to have some Ad Blockers trump the Springer methods within a few hours.

SUMMARY OF THE INVENTION

In one aspect, disclosed herein are computer-implemented systems comprising a digital processing device comprising at least one processor, an operating system configured to perform executable instructions, a memory, and a computer program including instructions executable by the digital processing device to create a pay-per-access micropayment-based server application comprising: a software module receiving a request for a page from a browser-user, the request made without payment information, the page comprising content provided by a publisher; a software module responding to the request for a page from a browser-user, the response comprising: a redirect URL, a payment request, or rebate information; a software module receiving a re-request for the page from the browser-user with payment information, the payment provided at least in part to the publisher or an entity associated with the publisher; whereby the publisher is compensated for providing the content and the browser-user recovers some or all of the payment or receive a payment from an advertising source. In some embodiments, the payment information in the re-request comprises a micropayment. In some embodiments, the application further comprises a software module aggregating a plurality of micropayments. In further embodiments, the application comprises a software module serving the page and inserting ads permitted by the browser-user from an advertising source. In some embodiments, the payment information in the re-request comprises willingness to pay, a method of payment such as micropayments, one or more sources preferred for recovering money by inserting advertisements, or the amount of the payment. In some embodiments, the payment information in the re-request comprises one or more credentials attesting to the value of the browser-user to the publisher. In further embodiments, the application comprises a software module confirming the credentials, for example, a software module confirming the credentials with a third party or a software module allowing direct evaluation of the credentials by the publisher.

In another aspect, disclosed herein are non-transitory computer-readable storage media encoded with a computer program including instructions executable by a processor to create a pay-per-access micropayment-based server application comprising: a software module receiving a request for a page from a browser-user, the request made without payment information, the page comprising content provided by a publisher; a software module responding to the request for a page from a browser-user, the response comprising: a redirect URL, a payment request, or rebate information; a software module receiving a re-request for the page from the browser-user with payment information, the payment provided at least in part to the publisher or an entity associated with the publisher; whereby the publisher is compensated for providing the content and the browser-user recovers some or all of the payment or receives a payment from an advertising source. In some embodiments, the payment information in the re-request comprises a micropayment. In further embodiments, the micropayment is aggregated with other micropayments. In some embodiments, the application further comprises a software module aggregating a plurality of micropayments. In some embodiments, the payment information in the re-request comprises willingness to pay, a method of payment such as micropayments, one or more sources preferred for recovering money by inserting advertisements, or the amount of the payment. In some embodiments, the payment information in the re-request comprises one or more credentials attesting to the value of the browser-user to the publisher. In further embodiments, the application comprises a software module confirming the credential, for example, a software module confirming the credentials with a third party or a software module allowing direct evaluation of the credentials by the publisher. In further embodiments, the application comprises a software module serving the page and inserting ads permitted by the browser-user from an advertising source.

In another aspect, disclosed herein are computer-implemented methods of providing a pay-per-access micropayment-based server application comprising: receiving a request for a page from a browser-user, the request made without payment information, the page comprising content provided by a publisher; responding to the request for a page from a browser-user, the response comprising: a redirect URL, a payment request, or rebate information; receiving a re-request for the page from the browser-user with payment information, the payment provided at least in part to the publisher or an entity associated with the publisher; whereby the publisher is compensated for providing the content and the browser-user recovers some or all of the payment or receives a payment from an advertising source. In some embodiments, the payment information in the re-request comprises a micropayment. In further embodiments, the method comprises aggregating the micropayment with other micropayments. In some embodiments, the payment information in the re-request comprises willingness to pay, a method of payment such as micropayments, one or more sources preferred for recovering money by inserting advertisements, or the amount of the payment. In some embodiments, the payment information in the re-request comprises one or more credentials attesting to the value of the browser-user to the publisher or an entity associated with the publisher. In further embodiments, the method comprises confirming the credentials, for example, with a third party or by direct evaluation of the credentials by the publisher. In further embodiments, the method comprises serving the page and inserting ads permitted by the browser-user from an advertising source.

In another aspect, disclosed herein are computer-implemented systems comprising a digital processing device comprising at least one processor, an operating system configured to perform executable instructions, a memory, and a computer program including instructions executable by the digital processing device to create a pay-per-access micropayment-based server application comprising: a software module receiving a request for a page from a browser-user, the request made with payment information comprising willingness to pay, a method of payment, one or more sources preferred for recovering money by inserting advertisements, or the amount of the payment, the page comprising content provided by a publisher, the payment to be provided at least in part to the publisher or an entity associated with the publisher; a software module responding to the request for a page from a browser-user, the response comprising: a redirect URL, a payment request, or rebate information; a software module receiving a re-request for the page from the browser-user with payment information; whereby the publisher is compensated for providing the content and the browser-user recovers some or all of the payment or receives a payment from an advertising source. In some embodiments, the payment information in the re-request comprises a micropayment. In further embodiments, the micropayment is aggregated with other micropayments. In some embodiments, the application further comprises a software module aggregating a plurality of micropayments. In some embodiments, the payment information in the re-request comprises one or more credentials attesting to the value of the browser-user to the publisher. In further embodiments, the application comprises a software module confirming the credentials, for example, a software module confirming the credentials with a third party or a software module allowing direct evaluation of the credentials by the publisher. In further embodiments, the application comprises a software module serving the page and inserting ads permitted by the browser-user from a service provider In another aspect, disclosed herein are non-transitory computer-readable storage media encoded with a computer program including instructions executable by a processor to create a pay-per-access micropayment-based server application comprising: a software module receiving a request for a page from a browser-user, the request made with payment information comprising willingness to pay, a method of payment, one or more sources preferred for recovering money by inserting advertisements, or the amount of the payment, the page comprising content provided by a publisher, the payment to be provided at least in part to the publisher or an entity associated with the publisher; a software module responding to the request for a page from a browser-user, the response comprising: a redirect URL, a payment request, or rebate information; a software module receiving a re-request for the page from the browser-user with payment information; whereby the publisher is compensated for providing the content and the browser-user recovers some or all of the payment or receives a payment from an advertising source. In some embodiments, the payment information in the request or the re-request comprises a micropayment. In some embodiments, the application further comprises a software module aggregating a plurality of micropayments. In some embodiments, the payment information in the request or the re-request comprises one or more credentials attesting to the value of the browser-user to the publisher. In further embodiments, the application comprises a software module confirming the credentials, for example, a software module confirming the credentials with a third party or a software module allowing direct evaluation of the credentials by the publisher. In further embodiments, the application comprises a software module serving the page and inserting ads permitted by the browser-user from a service provider.

In another aspect, disclosed herein are computer-implemented methods of providing pay-per-access micropayment-based server application comprising: receiving a request for a page from a browser-user, the request made with payment information comprising willingness to pay, a method of payment, one or more sources preferred for recovering money by inserting advertisements, or the amount of the payment, the page comprising content provided by a publisher, the payment to be provided at least in part to the publisher or an entity associated with the publisher; responding to the request for a page from a browser-user, the response comprising: a redirect URL, a payment request, or rebate information; receiving a re-request for the page from the browser-user with payment information; whereby the publisher is compensated for providing the content and the browser-user recovers some or all of the payment or receives a payment from an advertising source. In some embodiments, the payment information in the request or the re-request comprises a micropayment. In further embodiments, the method comprises aggregating the micropayment with other micropayments. In some embodiments, the payment information in the request or the re-request comprises one or more credentials attesting to the value of the browser-user to the publisher. In further embodiments, the method comprises confirming the credentials, for example, with a third party or by direct evaluation of the credentials by the publisher. In further embodiments, the method comprises serving the page and inserting ads permitted by the browser-user from a service provider.

In one aspect, disclosed herein are computer-implemented systems comprising a digital processing device comprising at least one processor, an operating system configured to perform executable instructions, a memory, and a computer program including instructions executable by the digital processing device to create a pay-per-access micropayment-based web browsing application comprising: a software module sending a request for a page from a browser-user, the request made without payment information, the page comprising content provided by a publisher; a software module receiving a response to the request, the response comprising: a redirect URL, a payment request from a publisher, or rebate information; a software module sending a re-request for the page from the browser-user, with payment information comprising: acceptance of the payment terms or payment, the payment provided at least in part to the publisher or an entity (e.g., a charity, for profit or non-for-profit organization) associated with the publisher; whereby the publisher is compensated for providing the content and the browser-user recovers some or all of the payment or receives a payment from an advertising source. In some embodiments, the payment information in the re-request comprises a micropayment. In some embodiments, the application further comprises a software module aggregating a plurality of micropayments. In some embodiments, the application comprises a web browser or web browser plug-in, extension, or add-on. In some embodiments, the payment information in the re-request comprises one or more credentials attesting to the value of the browser-user. In further embodiments, the application comprises a software module loading the page and inserting ads permitted by the browser-user from a service provider.

In another aspect, disclosed herein are non-transitory computer-readable storage media encoded with a computer program including instructions executable by a processor to create a pay-per-access micropayment-based web browsing application comprising: a software module sending a request for a page from a browser-user, the request made without payment information, the page comprising content provided by a publisher; a software module receiving a response to the request, the response comprising: a redirect URL, a payment request, or rebate information; a software module sending a re-request for the page from the browser-user with payment information, the payment provided at least in part to the publisher or an entity (e.g., charity, a for profit or non-for-profit organization) associated with the publisher; whereby the publisher is compensated for providing the content and the browser-user recovers some or all of the payment or receives a payment from an advertising source. In some embodiments, the payment information in the re-request comprises a micropayment. In some embodiments, the application further comprises a software module aggregating a plurality of micropayments. In some embodiments, the application comprises a web browser or web browser plug-in, extension, or add-on. In some embodiments, the payment information in the re-request comprises one or more credentials attesting to the value of the browser-user to the publisher. In further embodiments, the application comprises a software module loading the page and inserting ads permitted by the browser-user from a service provider.

In another aspect, disclosed herein are computer-implemented methods of providing pay-per-access micropayment-based web browsing application comprising: sending a request for a page from a browser-user, the request made without payment information, the page comprising content provided by a publisher; receiving a response to the request, the response comprising: a redirect URL, a payment request from the publisher, or rebate information; sending a re-request for the page from the browser-user with payment information, the payment provided at least in part to the publisher or an entity (e.g., a charity, for profit or non-for-profit organization) associated with the publisher; whereby the publisher is compensated for providing the content and the browser-user recovers some or all of the payment or receives a payment from an advertising source. In some embodiments, the payment information in the re-request comprises a micropayment. In some embodiments, the method further comprises aggregating the micropayment with other micropayments. In some embodiments, the method comprises using a web browser or web browser plug-in, extension, or add-on. In some embodiments, the payment information in the re-request comprises one or more credentials attesting to the value of the browser-user to the publisher. In further embodiments, the method comprises loading the page and inserting ads permitted by the browser-user from an advertising source.

In another aspect, disclosed herein are computer-implemented systems comprising a digital processing device comprising at least one processor, an operating system configured to perform executable instructions, a memory, and a computer program including instructions executable by the digital processing device to create a pay-per-access micropayment-based web browsing application comprising: a software module sending a request for a page from a browser-user, the request made with payment information comprising willingness to pay, a method of payment, one or more sources preferred for recovering money by inserting advertisements, or the amount of the payment, the page comprising content provided by a publisher, the payment to be provided at least in part to the publisher or an entity (e.g., a charity, for profit or non-for-profit organization) associated with the publisher; a software module receiving a response to the request, the response comprising: a redirect URL, a payment request, or rebate information; a software module sending a re-request for the page from the browser-user with payment information; whereby the publisher is compensated for providing the content and the browser-user recovers some or all of the payment or receives a payment from an advertising source. In some embodiments, the payment information in the request or the re-request comprises a micropayment. In some embodiments, the application further comprises a software module aggregating a plurality of micropayments. In some embodiments, the application comprises a web browser or web browser plug-in, extension, or add-on. In some embodiments, the payment information in the request or the re-request comprises one or more credentials attesting to the value of the browser-user to the publisher. In further embodiments, the application comprises a software module loading the page and inserting ads permitted by the browser-user from a service provider.

In another aspect, disclosed herein are non-transitory computer-readable storage media encoded with a computer program including instructions executable by a processor to create a pay-per-access micropayment-based web browsing application comprising: a software module sending a request for a page from a browser-user, the request made with payment information comprising willingness to pay, a method of payment, one or more sources preferred for recovering money by inserting advertisements, or the amount of the payment, the page comprising content provided by a publisher, the payment to be provided at least in part to the publisher or an entity (e.g., a charity, for profit or non-for-profit organization) associated with the publisher; a software module receiving a response to the request, the response comprising: a redirect URL, a payment request, or rebate information; a software module sending a re-request for the page from the browser-user with payment information; whereby the publisher is compensated for providing the content and the browser-user recovers some or all of the payment or receives a payment from an advertising source. In some embodiments, the payment information in the request or the re-request comprises a micropayment. In some embodiments, the application further comprises a software module aggregating a plurality of micropayments. In some embodiments, the application comprises a web browser or web browser plug-in, extension, or add-on. In some embodiments, the payment information in the request or the re-request comprises one or more credentials attesting to the value of the browser-user to the publisher. In further embodiments, the application comprises a software module loading the page and inserting ads permitted by the browser-user from a service provider.

In another aspect, disclosed herein are computer-implemented methods of providing a pay-per-access micropayment-based web browsing application comprising: sending a request for a page from a browser-user, the request made with payment information comprising willingness to pay, a method of payment, one or more sources preferred for recovering money by inserting advertisements, or the amount of the payment, the page comprising content provided by a publisher, the payment to be provided at least in part to the publisher or an entity (e.g., a charity, for profit or non-for-profit organization) associated with the publisher; receiving a response to the request, the response comprising: a redirect URL, a payment request, or rebate information; sending a re-request for the page from the browser-user with payment information; whereby the publisher is compensated for providing the content and the browser-user recovers some or all of the payment or receives a payment from an advertising source. In some embodiments, the payment information in the request or the re-request comprises a micropayment. In some embodiments, the method further comprises aggregating a plurality of micropayments. In some embodiments, the method comprises using a web browser or web browser plug-in, extension, or add-on. In some embodiments, the payment information in the request or the re-request comprises one or more credentials attesting to the value of the browser-user to the publisher. In further embodiments, the method comprises loading the page and inserting ads permitted by the browser-user from an advertising source.

DETAILED DESCRIPTION OF THE INVENTION

Figure 1:
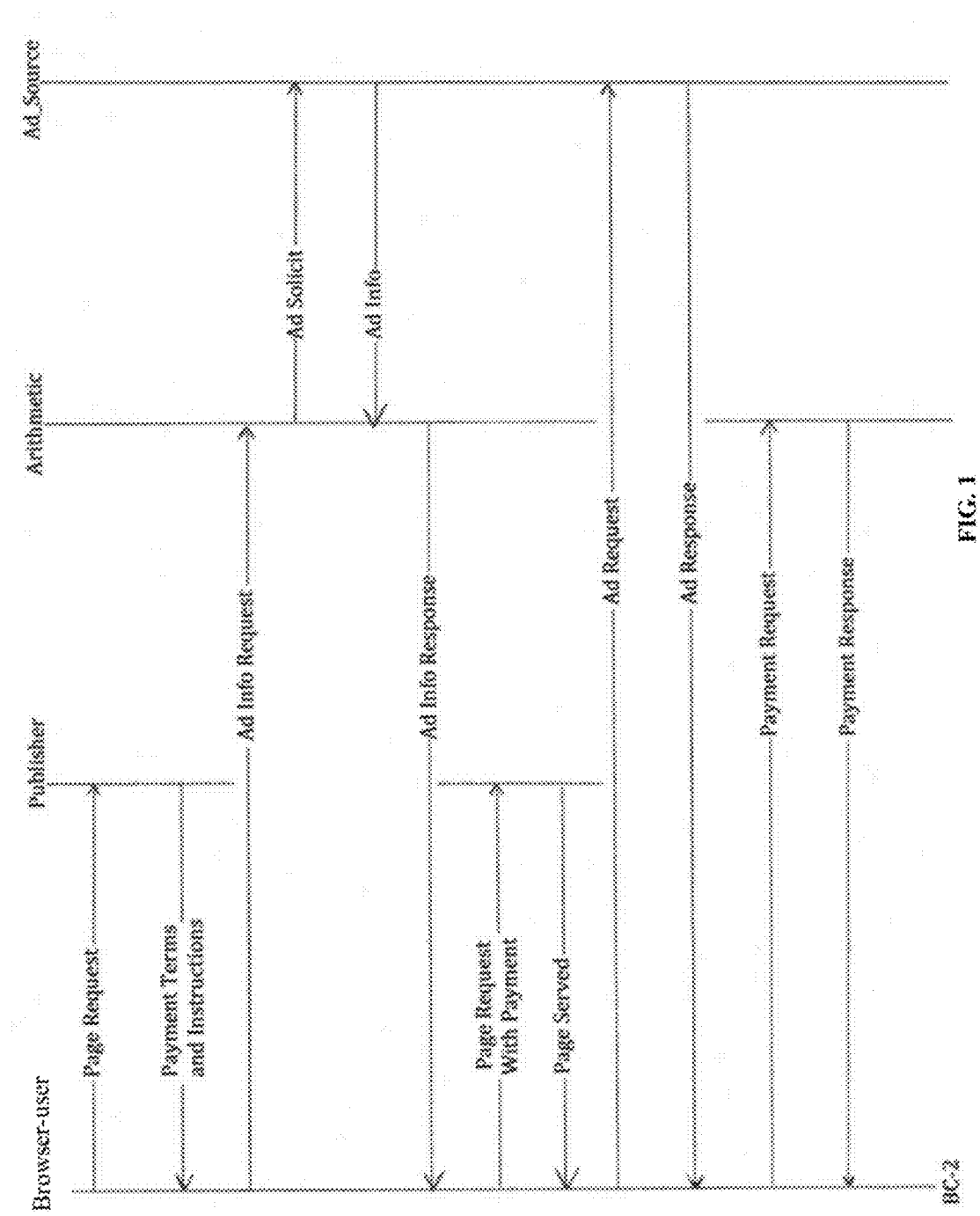
FIG. 1 shows a non-limiting example of a process flow; in this case, a process flow including the initial negotiation between the Browser-user and the Publisher as well as multiple parties to guarantee compensation to the Browser-user and to provide advertising for download to the Browser-user.

Described herein, in certain embodiments, computer-implemented systems comprising a digital processing device comprising at least one processor, an operating system configured to perform executable instructions, a memory, and a computer program including instructions executable by the digital processing device to create a pay-per-access micropayment-based server application comprising: a software module receiving a request for a page from a browser-user, the request made without payment information, the page comprising content provided by a publisher; a software module responding to the request for a page from a browser-user, the response comprising: a redirect URL, a payment request, or rebate information; a software module receiving a re-request for the page from the browser-user with payment information, the payment provided at least in part to the publisher or an entity associated with the publisher; whereby the publisher is compensated for providing the content and the browser-user recovers some or all of the payment or receive a payment from an advertising source.

In another aspect, disclosed herein are non-transitory computer-readable storage media encoded with a computer program including instructions executable by a processor to create a pay-per-access micropayment-based server application comprising: a software module receiving a request for a page from a browser-user, the request made without payment information, the page comprising content provided by a publisher; a software module responding to the request for a page from a browser-user, the response comprising: a redirect URL, a payment request, or rebate information; a software module receiving a re-request for the page from the browser-user with payment information, the payment provided at least in part to the publisher or an entity associated with the publisher; whereby the publisher is compensated for providing the content and the browser-user recovers some or all of the payment or receives a payment from an advertising source.

In another aspect, disclosed herein are computer-implemented methods of providing a pay-per-access micropayment-based server application comprising: receiving a request for a page from a browser-user, the request made without payment information, the page comprising content provided by a publisher; responding to the request for a page from a browser-user, the response comprising: a redirect URL, a payment request, or rebate information; receiving a re-request for the page from the browser-user with payment information, the payment provided at least in part to the publisher or an entity associated with the publisher; whereby the publisher is compensated for providing the content and the browser-user recovers some or all of the payment or receives a payment from an advertising source.

In another aspect, disclosed herein are computer-implemented systems comprising a digital processing device comprising at least one processor, an operating system configured to perform executable instructions, a memory, and a computer program including instructions executable by the digital processing device to create a pay-per-access micropayment-based server application comprising: a software module receiving a request for a page from a browser-user, the request made with payment information comprising willingness to pay, a method of payment, one or more sources preferred for recovering money by inserting advertisements, or the amount of the payment, the page comprising content provided by a publisher, the payment to be provided at least in part to the publisher or an entity associated with the publisher; a software module responding to the request for a page from a browser-user, the response comprising: a redirect URL, a payment request, or rebate information; a software module receiving a re-request for the page from the browser-user with payment information; whereby the publisher is compensated for providing the content and the browser-user recovers some or all of the payment or receives a payment from an advertising source.

In another aspect, disclosed herein are computer-implemented methods of providing pay-per-access micropayment-based server application comprising: receiving a request for a page from a browser-user, the request made with payment information comprising willingness to pay, a method of payment, one or more sources preferred for recovering money by inserting advertisements, or the amount of the payment, the page comprising content provided by a publisher, the payment to be provided at least in part to the publisher or an entity associated with the publisher; responding to the request for a page from a browser-user, the response comprising: a redirect URL, a payment request, or rebate information; receiving a re-request for the page from the browser-user with payment information; whereby the publisher is compensated for providing the content and the browser-user recovers some or all of the payment or receives a payment from an advertising source.

In one aspect, disclosed herein are computer-implemented systems comprising a digital processing device comprising at least one processor, an operating system configured to perform executable instructions, a memory, and a computer program including instructions executable by the digital processing device to create a pay-per-access micropayment-based web browsing application comprising: a software module sending a request for a page from a browser-user, the request made without payment information, the page comprising content provided by a publisher; a software module receiving a response to the request, the response comprising: a redirect URL, a payment request from a publisher, or rebate information; a software module sending a re-request for the page from the browser-user, with payment information comprising: acceptance of the payment terms or payment, the payment provided at least in part to the publisher or an entity (e.g., a charity, for profit or non-for-profit organization) associated with the publisher; whereby the publisher is compensated for providing the content and the browser-user recovers some or all of the payment or receives a payment from an advertising source.

In another aspect, disclosed herein are non-transitory computer-readable storage media encoded with a computer program including instructions executable by a processor to create a pay-per-access micropayment-based web browsing application comprising: a software module sending a request for a page from a browser-user, the request made without payment information, the page comprising content provided by a publisher; a software module receiving a response to the request, the response comprising: a redirect URL, a payment request, or rebate information; a software module sending a re-request for the page from the browser-user with payment information, the payment provided at least in part to the publisher or an entity (e.g., charity, a for profit or non-for-profit organization) associated with the publisher; whereby the publisher is compensated for providing the content and the browser-user recovers some or all of the payment or receives a payment from an advertising source.

In another aspect, disclosed herein are computer-implemented methods of providing pay-per-access micropayment-based web browsing application comprising: sending a request for a page from a browser-user, the request made without payment information, the page comprising content provided by a publisher; receiving a response to the request, the response comprising: a redirect URL, a payment request from the publisher, or rebate information; sending a re-request for the page from the browser-user with payment information, the payment provided at least in part to the publisher or an entity (e.g., a charity, for profit or non-for-profit organization) associated with the publisher; whereby the publisher is compensated for providing the content and the browser-user recovers some or all of the payment or receives a payment from an advertising source.

In another aspect, disclosed herein are computer-implemented systems comprising a digital processing device comprising at least one processor, an operating system configured to perform executable instructions, a memory, and a computer program including instructions executable by the digital processing device to create a pay-per-access micropayment-based web browsing application comprising: a software module sending a request for a page from a browser-user, the request made with payment information comprising willingness to pay, a method of payment, one or more sources preferred for recovering money by inserting advertisements, or the amount of the payment, the page comprising content provided by a publisher, the payment to be provided at least in part to the publisher or an entity (e.g., a charity, for profit or non-for-profit organization) associated with the publisher; a software module receiving a response to the request, the response comprising: a redirect URL, a payment request, or rebate information; a software module sending a re-request for the page from the browser-user with payment information; whereby the publisher is compensated for providing the content and the browser-user recovers some or all of the payment or receives a payment from an advertising source.

In another aspect, disclosed herein are non-transitory computer-readable storage media encoded with a computer program including instructions executable by a processor to create a pay-per-access micropayment-based web browsing application comprising: a software module sending a request for a page from a browser-user, the request made with payment information comprising willingness to pay, a method of payment, one or more sources preferred for recovering money by inserting advertisements, or the amount of the payment, the page comprising content provided by a publisher, the payment to be provided at least in part to the publisher or an entity (e.g., a charity, for profit or non-for-profit organization) associated with the publisher; a software module receiving a response to the request, the response comprising: a redirect URL, a payment request, or rebate information; a software module sending a re-request for the page from the browser-user with payment information; whereby the publisher is compensated for providing the content and the browser-user recovers some or all of the payment or receives a payment from an advertising source.

In another aspect, disclosed herein are computer-implemented methods of providing a pay-per-access micropayment-based web browsing application comprising: sending a request for a page from a browser-user, the request made with payment information comprising willingness to pay, a method of payment, one or more sources preferred for recovering money by inserting advertisements, or the amount of the payment, the page comprising content provided by a publisher, the payment to be provided at least in part to the publisher or an entity (e.g., a charity, for profit or non-for-profit organization) associated with the publisher; receiving a response to the request, the response comprising: a redirect URL, a payment request, or rebate information; sending a re-request for the page from the browser-user with payment information; whereby the publisher is compensated for providing the content and the browser-user recovers some or all of the payment or receives a payment from an advertising source.

Certain Definitions

Unless otherwise defined, all technical terms used herein have the same meaning as commonly understood by one of ordinary skill in the art to which this invention belongs. As used in this specification and the appended claims, the singular forms "a," "an," and "the" include plural references unless the context clearly dictates otherwise. Any reference to "or" herein is intended to encompass "and/or" unless otherwise stated.
Browser-User
As used herein, a "browser-user" refers, in some embodiments, to a client program or process used by a person to browse the Internet. In further embodiments, a browser-user includes any program that requests data content from Internet publishers without the need for direct instruction from a person. In a further embodiment, a browser-user includes a user agent. In further embodiments, a browser-user includes any browser available in the art, such as Web browsers (also called Internet browsers). In some embodiments, web browsers are software applications, designed for use with network-connected digital processing devices, for retrieving, presenting, and traversing information resources on the World Wide Web. Suitable web browsers include, by way of non-limiting examples, Microsoft® Internet Explorer®, Mozilla® Firefox®, Google® Chrome, Apple® Safari®, Opera Software® Opera®, and KDE Konqueror. In some embodiments, the browser-user is a mobile web browser. Mobile web browsers (also called mircrobrowsers, mini-browsers, and wireless browsers) are designed for use on mobile digital processing devices including, by way of non-limiting examples, handheld computers, tablet computers, netbook computers, subnotebook computers, smartphones, music players, personal digital assistants (PDAs), and handheld video game systems. Suitable mobile web browsers include, by way of non-limiting examples, Google® Android® browser, RIM BlackBerry® Browser, Apple® Safari®, Palm® Blazer, Palm® WebOS® Browser, Mozilla® Firefox® for mobile, Microsoft® Internet Explorer® Mobile, Amazon® Kindle® Basic Web, Nokia® Browser, Opera Software® Opera® Mobile, and Sony® PSP™ browser.
402 Status Code
As used herein, "402 status code" refers to a server response that initiates or advances the negotiation of payment for the Publisher content requested by a Browser-user. In some embodiments, the "402 status code" is a literal HTTP 402 response that instructs or directs the Browser-user to present payment or payment terms. In other embodiments, the "402 status code" is any HTTP code that is adapted to initiate, direct or advance the negotiation of payment for the Publisher content requested by the Browser-user.
A Different Look at the Advertising Transaction The platforms, systems, media, and methods disclosed herein arise from analyzing the advertisers' pay-for-display model differently by including the browser-user as an active participant (as payer or payee) in the exchange of money. In the current model, advertisers do not pay publishers based on the quality or quantity of the publisher's content. Instead, the advertiser pays the publisher based on the quality and quantity of the Users attracted to the publisher's content. The browser-user does not pay for the publisher's content with money. The browser-user pays with information about the User. That information is accessed via one or more "cookies" placed on the browser-user computer by the publisher and advertiser. In certain embodiments, information in the cookies identifies (directly or indirectly) which sites the browser-user has visited on the Internet, which products were purchased, which ads appeared on the content pages served to the browser-user, which ads the browser-user accessed, and the timing and sequence of all of those events. Publishers and advertisers use the accumulated information to build a profile of individual browser-users. The quality and quantity of the information on a browser-user determine the value of an advertisement presented by a particular advertiser for a particular product or service to that browser-user. An advertiser pays a publisher based on the accumulated value of the browser-users who request ads from the advertiser through that publisher. That is, the value of any monetary exchange is based on the browser-user's information, not on the publisher's content.
Requiring that the Browser-User Pay There are multiple sensible means of requesting prepayment from a browser-user for content available over the Internet. One simple method is to set up a long-term relationship by selling the User a subscription to a corpus of material. A large proportion of the content published on the Internet, however, is requested by Users who do not have (or expect to have) a long-term relationship with the publisher. For example, a newspaper story or a blog post referenced by a Twitter user with many followers inspires those followers to access the story or blog post. It is unrealistic to expect those followers to set up a subscriber relationship for such a transaction. Instead, the newspaper or blogger gets small payments from advertisers by serving advertising to the browser-users along with the story or blog post.

Requiring prepayment from a browser-user for a single published page or blog post runs up against the Arrow Information Paradox. The User cannot know ahead of time whether the information he is paying for has any value. On that basis, the User is unwilling to pay until after he has examined the material to determine its worth. Once the User has examined the material, however, the publisher has no leverage to demand payment from the User. This circumstance plays out in other non-Internet exchanges as well. Suppose a writer and a comedian, strangers to each other, are in a negotiation. The writer says that he has a joke that is worth $50. The comedian, aware that the material may not fit his act (or may not be funny), is unwilling to pay without hearing the joke first. Once the writer has disclosed the joke, however, he is faced with the prospect that the comedian can just walk away without paying—but still use the joke in his act. Untold billions of Internet transactions fit this pattern. In the past, publishers have not demanded payment from browser-users because advertisers were willing to pay publishers for the opportunity to display advertising alongside the publishers' content.

The Arrow information paradox is baked into the browsing model of the Internet. The introduction of advertising as a mechanism for getting around this paradox was almost immediate. The fact that the funding was based on the value of the browser-users to the advertisers was largely unnoticed or unacknowledged. Now the widespread use of Ad Blocking threatens this funding model.

An Illustrative Dilemma

The inevitable demise of the historical advertising-financed model of funding the Internet is evident from the DrudgeReport/HuffingtonPost Dilemma (the "DR/HP Dilemma"). The DrudgeReport is a politically conservative website that presents its visitors with an organized collection of links to news stories and links to other websites with similar political outlooks. The HuffingtonPost is a politically liberal website that presents a more magazine- or newspaper-like collection of stories or articles along with links to other websites with similar political outlooks. Both the DrudgeReport and the HuffingtonPost display advertising along with their content. Neither demands payment from visitors to the website as a precondition of viewing the published material available at the site.

A browser-user with the Stands Charity Ad Injection add-on who visits those websites will replace some of the advertising at DrudgeReport or HuffingtonPost with different ads provided by Stands for that browser-user. It's not much of a leap to imagine a DrudgeReport add-on (modeled after the Stands Charity Ad Injection add-on) that politically motivated conservatives could employ in their browsers that would substitute ads on the HuffingtonPost website with ads from the DrudgeReport website. Those browser-users could visit the HuffingtonPost website, read or view the materials there, but frustrate the owners of the HuffingtonPost while benefiting Matt Drudge. And, of course, politically motivated liberals could employ a similar HuffingtonPost add-on to substitute ads from the HuffingtonPost onto their web pages when visiting the DrudgeReport website.

The DR/HP Dilemma makes it apparent that the browser is sovereign. Browser makers and add-on makers will certainly begin to take advantage, employing Ad Blocker technology to provide customized Ad Replacement capabilities to browser-users. The Stands Charity Ad Injection example shows a way to harness a browser-user's web surfing activity to benefit any cause whatsoever, breaking the historical relationship between publishers' content and advertising revenue attached to that content. How is it possible for an advertiser to target a market audience in such chaos? With the link between published content and advertising broken, how does the advertiser connect to consumers? How can a publisher make a living when he can no longer guarantee that viewers of that content will also view the advertising that is supposed to accompany the content?

In a world where advertisers cannot be sure that publishers will reliably deliver ads to browser-users, the current advertising-financed model for funding the Internet breaks down. Therefore, in certain embodiments, publishers request actual payment from browser-users as a precondition for delivering content to the browser-user.

Micropayments

An alternative to subscription-based payments is micropayments, commonly understood as penny-level or sub-penny transactions. Many such schemes have been proposed since the popularization of the Internet, but there have always been significant impediments to actual implementation. See CapGemini Focus E-zine publication "Micropayments: Is the Nickel-and-Dime Approach Gaining Currency?" which is incorporated by reference.

Nick Szabo produced two significant papers on the topics of micropayments, "The Mental Accounting Barrier to Micropayments" (1996) and "Micropayments and Mental Transaction Costs" (1998), which are incorporated by reference.

In addition to the mental transaction costs, the financial transaction costs for sub-penny pay-per-access transactions swamps the micropayment itself. In the case of the Bitcoin currency, for example, transaction costs vary from nothing to a few cents. But a few cents is an insuperable barrier for transactions in the sub-penny range. That issue is being addressed by multiple initiatives that offer the prospect of "bundling" or "aggregating" multiple sub-penny transactions into a single transaction to be recorded on the Bitcoin blockchain or on a "sidechain." See "A simple explanation of Bitcoin Sidechains" and "Lightning-Network-Summary," which are incorporated by reference; see also more complete documentation of the Lightning Network at https://lightning.network/; and more complete documentation of one implementation of sidechains at https://blockstream.com/, e.g. https://blockstream.com/technology/sidechains.pdf, which are incorporated by reference. A blockchain can be a well-ordered collection of blocks, on which all users must (eventually) come to consensus. This determines the history of asset control and provides a computationally unforgeable time ordering for transactions. A sidechain can be a blockchain that validates data from other blockchains. In certain aspects, sidechains are extensions to existing blockchains, enhancing their privacy and functionality by adding features like smart contracts and confidential transactions.

For example, the Lightning Network built upon the underlying technology of the blockchain can be implemented into certain aspects of the platforms, systems, media, and methods disclosed herein. By using real Bitcoin/blockchain transactions and using its native smart-contract scripting language, the Lightning Network can be created as a secure network of participants which are able to transact at high volume and high speed.

Lightning Network Bidirectional Payment Channels

Two participants create a ledger entry on the blockchain, which requires both participants to sign off on any spending of funds. Both parties create transactions that refund the ledger entry to their individual allocation, but do not broadcast them to the blockchain. They can update their individual allocations for the ledger entry by creating many transactions spending from the current ledger entry output. Only the most recent version is valid, which is enforced by blockchain-parsable smart-contract scripting. This entry can be closed out at any time by either party without any trust or custodianship by broadcasting the most recent version to the blockchain.

By creating a network of these two-party ledger entries, it is possible to find a path across the network similar to routing packets on the Internet. The nodes along the path are not trusted, as the payment is enforced using a script that enforces the atomicity (either the entire payment succeeds or fails) via decrementing time-locks.

As a result, it is possible to conduct transactions off-blockchain without limitations. Transactions can be made off-chain with confidence of on-blockchain enforceability. This is similar to how one makes many legal contracts with others, but one does not go to court every time a contract is made. By making the transactions and scripts parsable, the smart-contract can be enforced on-blockchain. Only in the event of non-cooperation is the court involved—but with the blockchain, the result is deterministic.

In certain aspects, the platforms, systems, media, and methods disclosed herein overcome the mental transaction barrier and enable pay-per-access micropayments and overcome the financial transaction costs by automating the micropayment negotiation between browser-users and publishers. In certain aspects, the platforms, systems, media, and methods disclosed herein overcome the financial transaction barrier by bundling or aggregating multiple micropayments into a single financial transaction, such as using the technology of blockchain or sidechain. In certain aspects, in this way the platforms, systems, media, and methods disclosed herein preserve the advertising-financed model for funding the Internet.

In the DR/HP Dilemma environment, the publisher has the choice of delivering his content free of charge and depending on some voluntary form of payment from the browser-user or demanding prior payment from the browser-user for his content. Payment could take the form of a direct or indirect monetary transaction or acceptance of advertising delivered along with the publisher's content.

In certain aspects, the platforms, systems, media, and methods disclosed herein facilitate monetary transactions between the browser-user and the publisher. In certain aspects, the platforms, systems, media, and methods disclosed herein facilitate the use of advertising to pay for the publisher's delivery of content to the browser-user.

In certain aspects, the platforms, systems, media, and methods disclosed herein are based on the insights that: 1) advertisers are paying for browser-user information, not publisher content; 2) it is possible to share the advertising money with browser-users; 3) browser-users have the capability to substitute advertising of their choosing and receive payment (directly or indirectly) from the advertisers; 4) publishers will need to share advertising revenue with browser-users or collect payment for their content (directly or indirectly) from browser-users. The historical advertising-financed funding of the Internet failed to include browser-users in the economic exchange (other than the browser-user's request for the publisher's content). Current efforts at revenue sharing such as Stands (see http://www-.standsapp.org/) and Brave (see https://brave.com/) fail to address the economic incentives built into the relationships among browser-users, publishers and advertisers. In certain aspects, the platforms, systems, media, and methods disclosed herein are for rescuing the advertising-financed model of funding the Internet from its otherwise inevitable demise in the wake of ad blocking technology.

Circumstances and Expectations

Ad Blocking threatens the advertising-financed funding model that has historically powered the Internet.

Users prefer the ad-free experience under current circumstances.

Content publishers require some form of payment.

Universal Ad Blocking could remove almost all advertising-dependent content from the Internet.

Arrow's Information Paradox impedes direct per-use browser-user-to-publisher micropayments.

The mechanisms are already (and still) in place for attaching value to the browser-user's information to advertisers.

Users can and will take control of the advertising that appears on their browser pages.

Users are willing to pay publishers so long as the payments do not require per-use decision-making.

Users would prefer to collect money for opening up their browser pages to advertising.

Advertisers are willing to pay more for impressions that are targeted to browser-users matching particular profiles.

Even using Bitcoin, per-ad transaction costs swamp the actual transaction amount. Therefore, transaction aggregation is used to implement micropayments in Bitcoin in some embodiments.

Current micropayment mechanisms fail to offer per-transaction costs sufficiently lower than per-ad values. Therefore, regardless of micropayment mechanism, aggregation is used to implement micropayments in some embodiments.

For a very large number of interactions between browser-users and publishers, "direct aggregation" involving just the browser-user and the publisher is not feasible. Third-party aggregation between browser-users and the third party is feasible.

For a very large number of interactions between browser-users and advertisers, "direct aggregation" involving just the browser-user and the advertiser is not feasible. Third-party aggregation between browser-users and the third party is feasible.

In an environment where browser-users are paid for the value of their personal information, they can afford to pay publishers for the publishers' content.

The task of finding the ads to fund the browser-user's access to the publisher's content can be shared among browser-users, publishers, advertisers and third-party aggregators or others.

Baselines for the "value" of a browser-user's information are available—expressed in, for example, the PPM or CPM rates paid by advertisers to various publishers.

One way to resolve all of the preceding issues is to recognize that the most readily accessible estimate of the value of the transaction between a browser-user and a publisher is the value of the browser-user's information to potential advertisers. In a post-DR/HP Dilemma world, browser-users, publishers, advertisers, and third-party aggregators negotiate per-access payments to publishers for content by placing selected advertising on the browser-user's display.

It should be noted that the publishers is cut out of some transactions if the browser-user makes arrangements to view advertising without publisher content in some embodiments. Also, it should be noted that a single entity functions in more than one role in some embodiments as exemplified by the scenarios presented below. For example:

Advertiser: In some embodiments, an advertising network or other service working on behalf of an advertiser.

Publisher: In some embodiments, an advertiser on its own site or on other sites.

Third-Party Aggregator: In some embodiments, an advertiser or publisher.

Implementations

Many variations to the platforms, systems, media, and methods described herein are suitable. By way of example, in some embodiments, the server responds without a 402 status code (200, 301, etc.). By way of further example, in various embodiments, the response does not include a redirect URL, specifies payment method other than payment channel, specifies the payment method as a transaction requiring a signature, includes cryptographic signatures, or cryptographic proofs, and/or includes rebate information to the service provider. By way of further example, in various embodiments, the user re-requests without checking with the service provider, checks signature locally at the browser, checks zero-knowledge proof locally at the browser, and/or avoids steps by being logged in. By way of further example, in various embodiments, the service provider tells the Browser-user if the signature checks out, if the offer checks out, what the probability of it working out might be, if the browser-user trusts the content provider, or if the service provider trusts the content provider. By way of further example, in various embodiments, the Browser-user requesting a page with payment information means opening a channel, providing a receipt, and/or signing a response transaction.

In a particular embodiment, the order of operations is:
1) Browser-user asks for page;
2) Publisher sends negative response with information how to re-request;
3) Browser-user evaluates the response;
4) Browser-user re-requests with payment;
5) Publisher serves page requested; and
6) Browser-user inserts advertising to recover money.

In light of the disclosure provided herein, it will be apparent to those of skill in the art that any available methods can be used to check for signatures, including, but not limited to, a promise, use a payment channel, or a receipt from some other off chain solution.

Referring to FIG. 1, in a particular embodiment, an initial negotiation is conducted between the Browser-user and the Publisher as well as multiple parties to guarantee compensation to the Browser-user and to provide advertising for download to the Browser-user. In this embodiment, the transaction begins with a normal HTTP GET request from the Browser-user to the Publisher for a page. The Publisher responds, not with the page content, as is commonly the case now, but with Payment Terms and Instructions. The Payment Terms set out a price for acquiring the contents of the Publisher's content. In this embodiment, the Instructions identify rebate information for possible advertising sources that will pay the Browser-user to accept advertising from those sources. Further, in this embodiment, the Instructions optionally include a cryptographically signed guarantee of payment to the Browser-user, the signature being from the Publisher or some other source likely to be trusted by the Browser-user.

Continuing to refer to FIG. 1, in a particular embodiment, the Publisher's Instructions includes a reference to a third-party service acting on the Browser-users behalf. The Browser-user examines the Publisher's Instructions and selects one or more possible sources of advertising. In this instance, the Browser-user follows the Instructions that direct the Browser-user to the third-party service. The third-party service evaluates the information from the Browser-user, including, for example, cookie information from the Browser-user's previous use of the third-party service. Based on the information available to the third-party service, the third-party service accesses advertising sources, including, in this instance, the Ad-Source. In this embodiment, the third-party service sends some, all or none of its information about the Browser-user (either specific to the Browser-user or profile-type information) in requesting qualifying advertisements from the Ad-Source. The Ad-Source responds to the third-party service with information identifying available advertising, including a price that is payable to the third-party service, acting, in this example, as the agent for the Browser-user. The third-party service selects a set of advertisement information from one of the advertising sources solicited, Ad-Source in this example, and responds to the Ad Info Request from the Browser-user with information ("Ad Info Response") the Browser-user can rely on to receive compensation sufficient to cover the payment required to access the Publisher's page content. The Browser-user, satisfied that the cost of accessing the Publisher's page content will be covered, re-requests the page and submits payment in the form acceptable to the Publisher along with the page request. The Publisher then serves the page to the Browser-user. The Browser-user then requests the advertisement(s) from the Ad-Source as specified in the Ad Info Response from the third-party service, and the Ad-Source serves the advertisements to the Browser-user. The Browser-user then makes a payment request to the third-party service, providing information sufficient to establish that the Browser-user received the advertisements from the Ad-Source as agreed. The third-party service, upon confirming the Browser-user's information regarding advertising received, pays the Browser-user the agreed amount.

In light of the disclosures provided herein, one of skill in the art will recognize that the examples described above permit and encompass many possible variations. By way of example, in some embodiments, the third-party service operates its own advertising inventory in addition to or exclusive of requests for advertising from other sources. By way of further example, in some embodiments, the Ad-Source is many layers deep, seeking advertisements from other third parties. By way of further example, in some embodiments, the Browser-user has independent connections to advertising sources that could be consulted along with or to the exclusion of the advertising sources offered by the Publisher or by a third-party service. For example, in FIG. 1, the Publisher's Instructions, in alternative embodiments, do not include the third-party service as a guarantor of payment or a source of advertising, but the Browser-user communicates with the third-party service of its own accord. By way of further example, in some embodiments, the Browser-user requests advertisements from the Ad-Source and requests payment from the third-party service (and even receives payment) prior to re-requesting the Publisher's page. By way of further example, the Browser-user optionally pre-emptively identifies its own proposed payment terms and/or Instructions. By way of further example, the Browser-user's re-request of page content is explicit or implicit. By way of further example, the negotiation of Payment Terms between a Browser-user and a Publisher requires more than one offer of terms from one or both parties.

Figure 2:
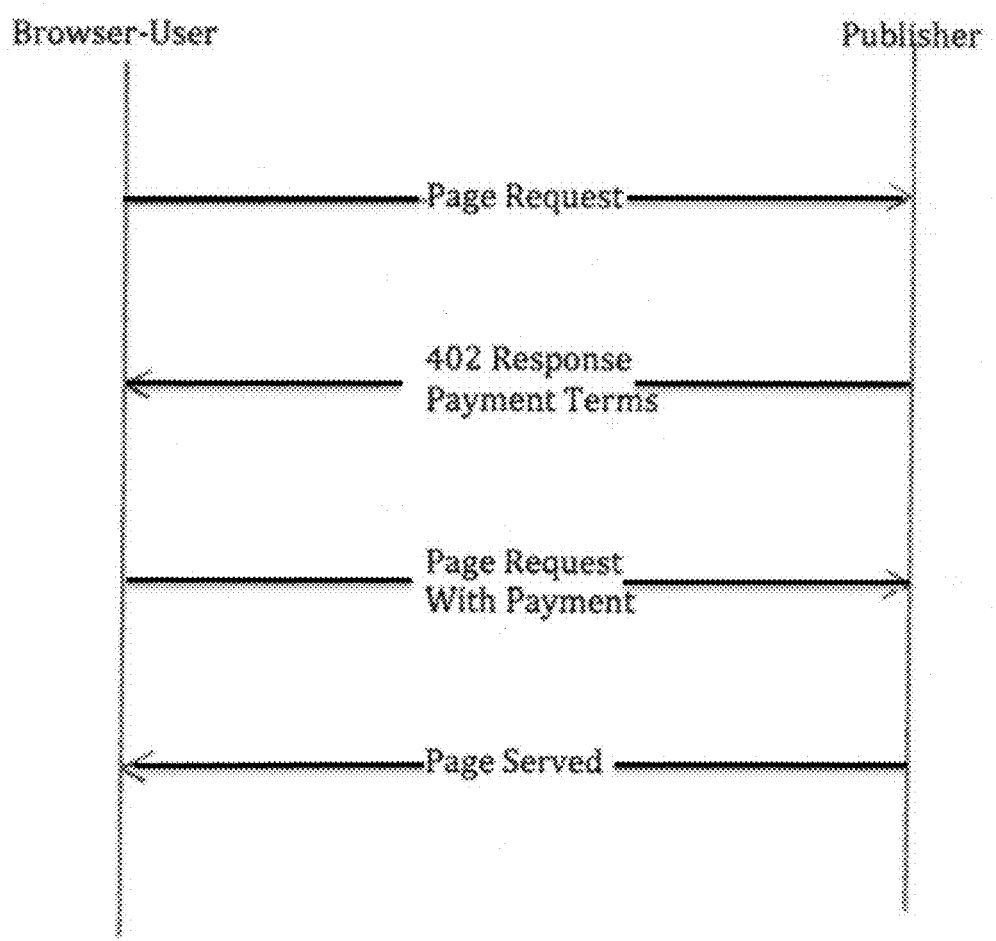
FIG. 2 shows a non-limiting example of a process flow; in this case, a process flow including negotiation between the Browser-user and a Publisher in which the Browser-user's initial request is a normal HTTP GET request.

Referring to FIG. 2, in a particular embodiment, the Browser-user and a Publisher conduct a negotiation in which the Browser-user's initial request is a normal HTTP GET request. In this embodiment, the transaction begins with a normal HTTP GET request from the Browser-user to the Publisher for a page. The Publisher responds, not with the page content as is commonly the case now, but with proposed Payment Terms in available format, such as in a format of a 402 status code that includes: a redirect URL, a payment request (amount, channel), or rebate information. In this embodiment, the Payment Terms set out a price for acquiring the contents of the Publisher's content. Browser-user can check on the Payment Terms from the Publisher, such as the rebate information and determine whether to re-request the page with payment. In this embodiment, Browser-user re-requests the page with payment information and then the Publisher serves the page to the Browser-user upon receiving the payment information.

Figure 3:
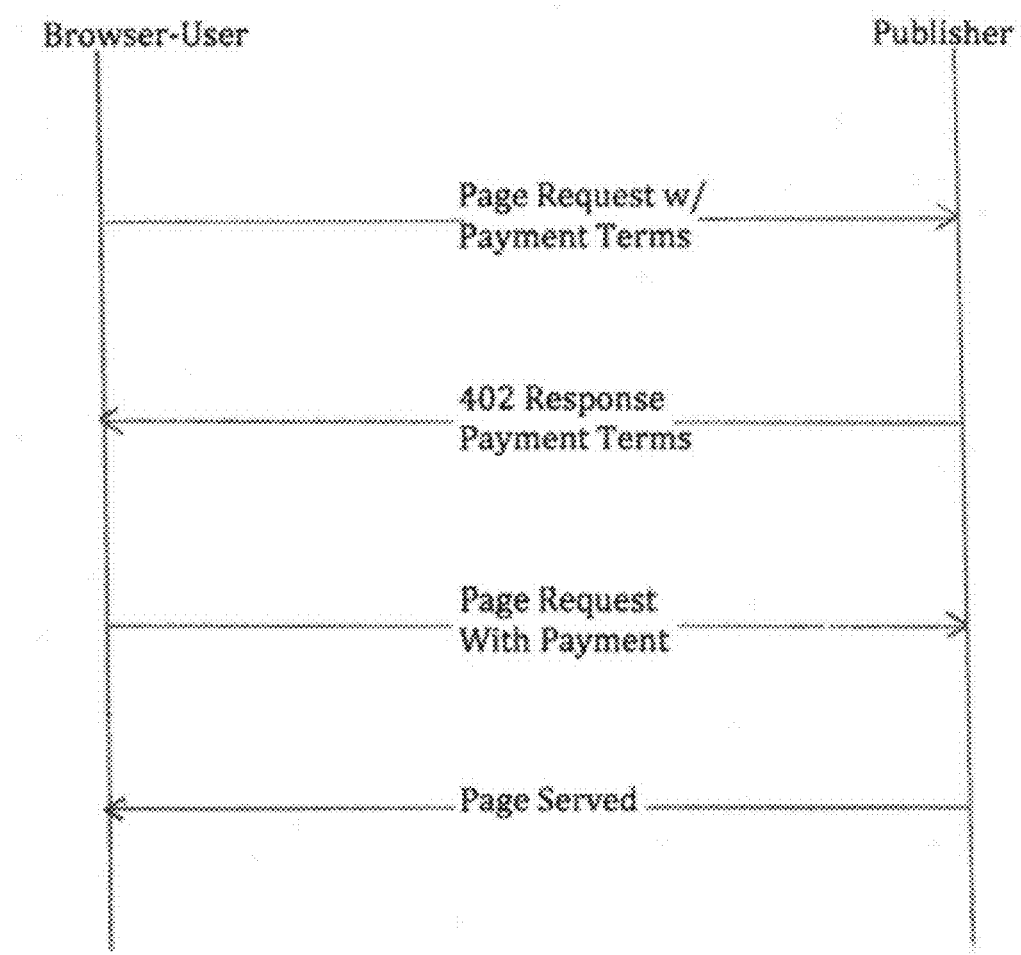
FIG. 3 shows a non-limiting example of a process flow; in this case, a process flow including negotiation between the Browser-user and a Publisher in which the Browser-user's initial request includes proposed Payment Terms for receiving the Publisher's content.

Referring to FIG. 3, in a particular embodiment, the Browser-user and a Publisher conduct a negotiation in which the Browser-user's initial request includes proposed Payment Terms for receiving the Publisher's content. In this embodiment, the transaction begins with Browser-user's initial request including proposed Payment Terms for receiving the Publisher's content. The Publisher responds, with agreed or counter Payment Terms in available format, such as in a format of a 402 status code that includes: a redirect URL, a payment request (amount, channel), or rebate information. In this embodiment, the Payment Terms set out a price for acquiring the contents of the Publisher's content through negotiation between the Browser-user and Publisher. In this embodiment, Browser-user checks on the agreed or counter Payment Terms from the Publisher, such as the rebate information and determines whether to re-request the page with payment. In this embodiment, Browser-user re-requests the page with payment information and then the Publisher serves the page to the Browser-user upon receiving the payment information.

Figure 4:
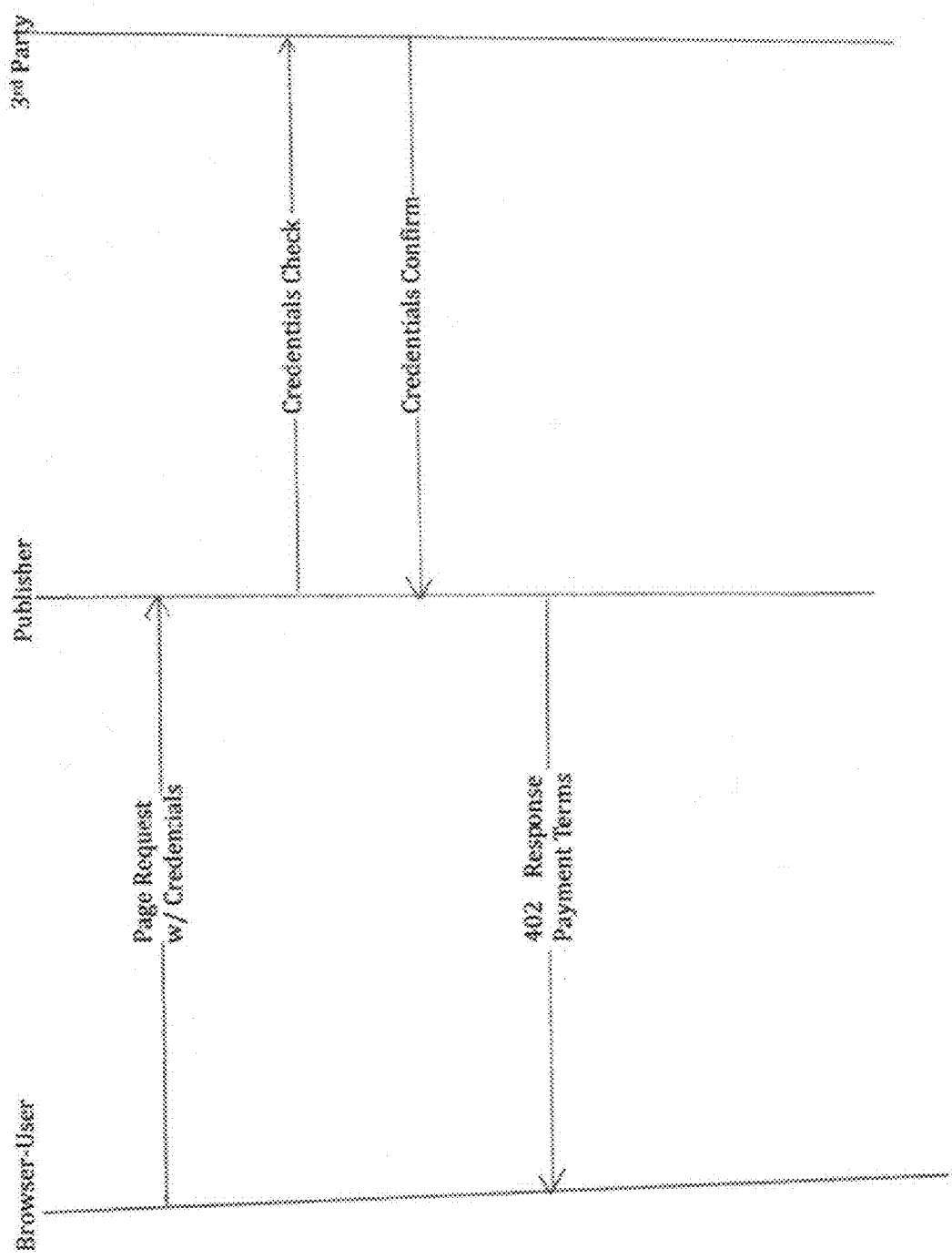
FIG. 4 shows a non-limiting example of a process flow; in this case, a process flow including submission of one or more credentials attesting to the value of a Browser-user to the Publisher along with the Browser-user's request for content from the Publisher.

Referring to FIG. 4, in a particular embodiment, one or more credentials are submitted attesting to the value of a Browser-user to the Publisher along with the Browser-user's request for content from the Publisher. In this embodiment, the transaction begins with Browser-user's initial request with payment information including one or more credentials attesting to the value of a Browser-user to the Publisher along with the Browser-user's request for content from the Publisher. In certain aspects, the credentials include, for example, a reference to a Third Party for confirmation. In other aspects, the credentials include a message signed with the private key of a Third Party, which message would be sufficient for the Publisher to accept the attested value. The Publisher checks the credentials with a Third Party, and the Third Party responds to the Publisher by confirming the Credentials (or discrediting the credentials). Upon receiving a confirmation of the credentials, the Publisher responds to the Browser-user, with Payment Terms for receiving the Publisher's content in available format, such as in a format of a 402 status code that includes: a redirect URL, a payment request (amount, channel, etc.), or rebate information.

EXAMPLES

The following illustrative examples are representative of embodiments of the software applications, systems, and methods described herein and are not meant to be limiting in any way.

Example 1—HTTP Layer (402) Publisher Opens Negotiation

1) Browser-user requests page without payment information;

2) Server responds with 402 status code that includes: a redirect URL, a payment request (amount, channel), or rebate information;

3) Browser-user checks on the rebate information and determines whether to re-request the page with payment;

4) Browser-user re-requests the page with payment information; and

5) Page loads and browser-user inserts ads from advertising source(s) to recover money.

Example 2—HTTP Layer (402) Browser-User Opens Negotiation

1) Browser-user requests page with payment information, including willingness to pay, the method by which it is willing to pay, the preferred source(s) for recovering money by inserting advertisements, and the amount it is willing to pay;

2) Server responds with 402 status code that includes: a redirect URL, a payment request (amount, channel), or rebate information;

3) Browser-user checks counter-signatures on the response to verify authenticity and determines whether to re-request the page with payment;

4) Browser-user re-requests the page with payment information; and

5) Page loads and browser-user inserts ads from service provider to recover money.

While preferred embodiments of the present invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention.

Referring to Examples 1 and 2, in Example 1, when a server responds with a 402 status code, it includes, for example, information about how to re-request the page, how much money to include with the request a (payment channel), and information about where the browser-user will be able to recover money to fund the request. In Example 2, the browser-user requests a page with information in the request header that notifies the server of its willingness to pay, the method by which it's willing to pay, the preferred source(s) it prefers for recovering money by inserting advertisements, and the amount it is willing to pay. Example 2 illustrates some optimization opportunities for cutting down the numbers of calls required to negotiate the browser-user's request for a page. One such efficiency is that step #3 changes to the browser-user checking counter-signatures on the response to verify authenticity rather than making a network call to a service provider.

Digital Processing Device

In some embodiments, the platforms, systems, media, and methods described herein include a digital processing device, or use of the same. In further embodiments, the digital processing device includes one or more hardware central processing units (CPUs) or general purpose graphics processing units (GPGPUs) that carry out the device's functions. In still further embodiments, the digital processing device further comprises an operating system configured to perform executable instructions. In some embodiments, the digital processing device is optionally connected a computer network. In further embodiments, the digital processing device is optionally connected to the Internet such that it accesses the World Wide Web. In still further embodiments, the digital processing device is optionally connected to a cloud computing infrastructure. In other embodiments, the digital processing device is optionally connected to an intranet. In other embodiments, the digital processing device is optionally connected to a data storage device.

In various embodiments, suitable digital processing devices include, by way of non-limiting examples, server computers, desktop computers, laptop computers, notebook computers, subnotebook computers, netbook computers, netpad computers, set-top computers, media streaming devices, handheld computers, Internet appliances, mobile smartphones, tablet computers, personal digital assistants, video game consoles, and other vehicles. Those of skill in the art will recognize that many smartphones are suitable for use in the system described herein. Those of skill in the art will also recognize that select televisions, video players, and digital music players with optional computer network connectivity are suitable for use in the system described herein. Suitable tablet computers include those with booklet, slate, and convertible configurations, known to those of skill in the art.

In some embodiments, the digital processing device includes an operating system configured to perform executable instructions. The operating system is, for example, software, including programs and data, which manages the device's hardware and provides services for execution of applications. Those of skill in the art will recognize that suitable server operating systems include, by way of non-limiting examples, FreeBSD, OpenBSD, NetBSD®, Linux, Apple® Mac OS X Server®, Oracle® Solaris®, Windows Server®, and Novell® NetWare®. Those of skill in the art will recognize that suitable personal computer operating systems include, by way of non-limiting examples, Microsoft® Windows®, Apple® Mac OS X®, UNIX®, and UNIX-like operating systems such as GNU/Linux®. In some embodiments, the operating system is provided by cloud computing. Those of skill in the art will also recognize that suitable mobile smart phone operating systems include, by way of non-limiting examples, Nokia® Symbian® OS, Apple® iOS®, Research In Motion® BlackBerry OS®, Google® Android®, Microsoft® Windows Phone® OS, Microsoft® Windows Mobile® OS, Linux®, and Palm® WebOS®. Those of skill in the art will also recognize that suitable media streaming device operating systems include, by way of non-limiting examples, Apple TV®, Roku®, Boxee®, Google TV®, Google Chromecast®, Amazon Fire®, and Samsung® HomeSync®. Those of skill in the art will also recognize that suitable video game console operating systems include, by way of non-limiting examples, Sony® PS3®, Sony® PS4®, Microsoft® Xbox 360®, Microsoft Xbox One, Nintendo® Wii®, Nintendo® Wii U®, and Ouya®.

In some embodiments, the device includes a storage and/or memory device. The storage and/or memory device is one or more physical apparatuses used to store data or programs on a temporary or permanent basis. In some embodiments, the device is volatile memory and requires power to maintain stored information. In some embodiments, the device is non-volatile memory and retains stored information when the digital processing device is not powered. In further embodiments, the non-volatile memory comprises flash memory. In some embodiments, the non-volatile memory comprises dynamic random-access memory (DRAM). In some embodiments, the non-volatile memory comprises ferroelectric random access memory (FRAM). In some embodiments, the non-volatile memory comprises phase-change random access memory (PRAM). In other embodiments, the device is a storage device including, by way of non-limiting examples, CD-ROMs, DVDs, flash memory devices, magnetic disk drives, magnetic tapes drives, optical disk drives, and cloud computing based storage. In further embodiments, the storage and/or memory device is a combination of devices such as those disclosed herein.

In some embodiments, the digital processing device includes a display to send visual information to a user. In some embodiments, the display is a cathode ray tube (CRT). In some embodiments, the display is a liquid crystal display (LCD). In further embodiments, the display is a thin film transistor liquid crystal display (TFT-LCD). In some embodiments, the display is an organic light emitting diode (OLED) display. In various further embodiments, on OLED display is a passive-matrix OLED (PMOLED) or active-matrix OLED (AMOLED) display. In some embodiments, the display is a plasma display. In other embodiments, the display is a video projector. In still further embodiments, the display is a combination of devices such as those disclosed herein.

In some embodiments, the digital processing device includes an input device to receive information from a user. In some embodiments, the input device is a keyboard. In some embodiments, the input device is a pointing device including, by way of non-limiting examples, a mouse, trackball, track pad, joystick, game controller, or stylus. In some embodiments, the input device is a touch screen or a multi-touch screen. In other embodiments, the input device is a microphone to capture voice or other sound input. In other embodiments, the input device is a video camera or other sensor to capture motion or visual input. In further embodiments, the input device is a Kinect, Leap Motion, or the like. In still further embodiments, the input device is a combination of devices such as those disclosed herein.

Figure 5:
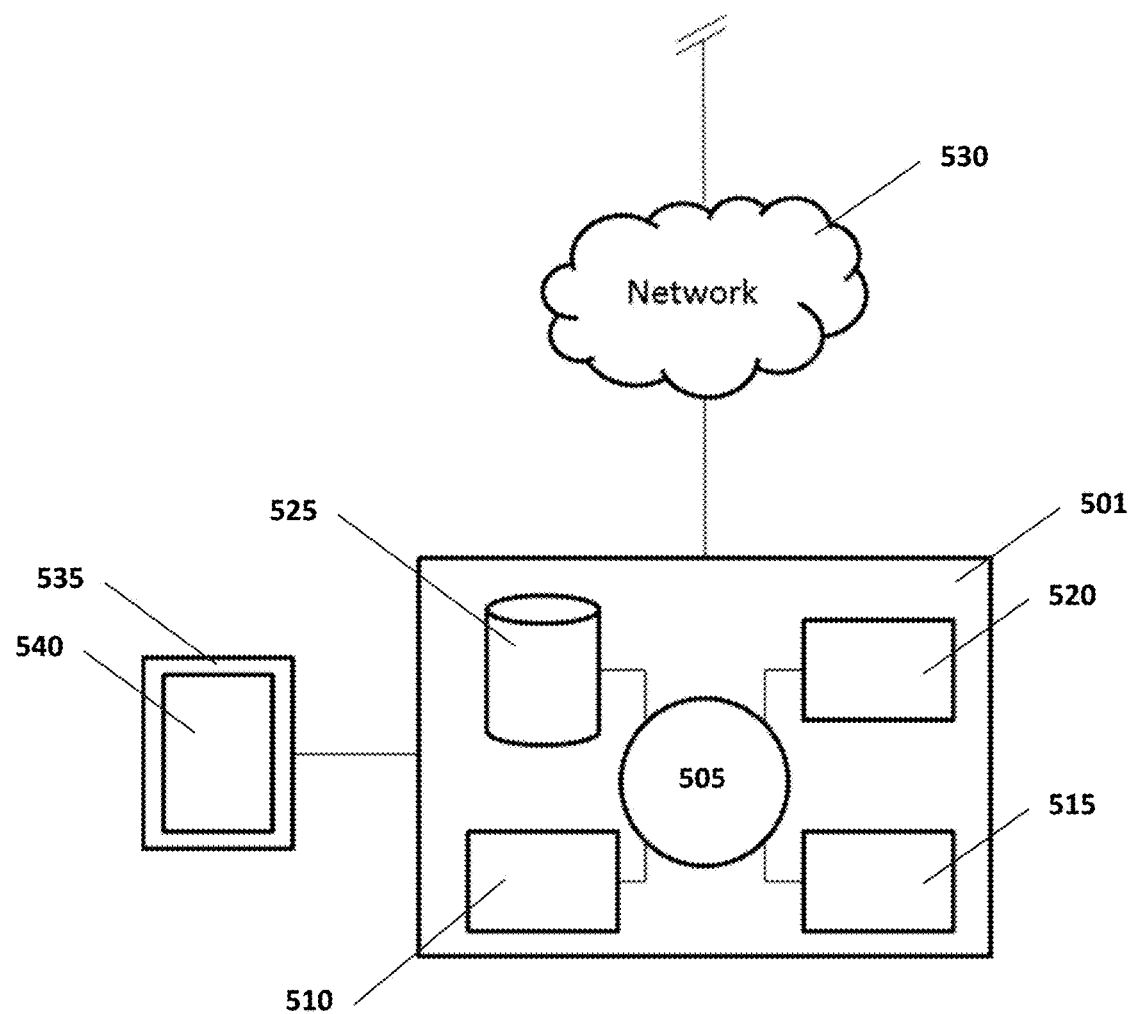
FIG. 5 shows a non-limiting example of a digital processing device for creating a pay-per-access micropayment-based application; in this case, a device with one or more CPUs, a memory, a communication interface, and a display.

Referring to FIG. 5, in a particular embodiment, a non-limiting exemplary digital processing device 501 comprise at least one processor, an operating system configured to perform executable instructions, a memory, and a computer program including instructions executable by the digital processing device to create a pay-per-access micropayment-based server application or web browsing application. The device 501 can regulate various aspects of payment aggregation and exchange of content with payment in the present disclosure, such as, for example, aggregating micropayments and responding to requests for content or proffers of payment. In this embodiment, the digital processing device 501 includes a central processing unit (CPU, also "processor" and "computer processor" herein) 505, which can be a single core or multi core processor, or a plurality of processors for parallel processing.

Continuing to refer to FIG. 5, in some aspects, the digital processing device 501 includes request unit 510 (e.g., a software module receiving a request for a page from a browser-user), response unit 515 (e.g., a software module responding to the request for a page from a browser-user, the response comprising a payment request or rebate information), re-request unit 520 (e.g., a software module receiving a re-request for the page from the browser-user with payment information, the payment provided at least in part to the publisher or an entity associated with the publisher), and data storage unit 525.

Continuing to refer to FIG. 5, in other aspects, the digital processing device 501 includes request unit 510 (e.g., a software module sending a request for a page from a browser-user), response unit 515 (e.g., a software module receiving a response to the request for a page from a browser-user, the response comprising a payment request or rebate information), re-request unit 520 (e.g., a software module sending a re-request for the page from the browser-user with payment information, the payment provided at least in part to the publisher or an entity associated with the publisher), and data storage unit 525.

Continuing to refer to FIG. 5, in a particular embodiment, the digital processing device 501 is operatively coupled to a computer network ("network") 530 with the aid of a communication interface (e.g., network adapter) for communicating with one or more other systems. The network 530 can be the Internet, an internet and/or extranet, or an intranet and/or extranet that is in communication with the Internet. The network 530 in some cases can be a telecommunication and/or data network. The network 530 can include one or more computer servers, which can enable distributed computing, such as cloud computing. The network 530, in some cases with the aid of the device 501, can implement a peer-to-peer network, which can enable devices coupled to the device 501 to behave as a client or a server. In some aspects, the digital processing device 501 can communicate with one or more remote computer systems through the network 530. For instance, the device 501 can communicate with a remote computer system of a user. Examples of remote computer systems include personal computers (e.g., portable PC), slate or tablet PCs (e.g., Apple® iPad, Samsung® Galaxy Tab), telephones, Smart phones (e.g., Apple® iPhone, Android-enabled device, Blackberry®), or personal digital assistants.

Continuing to refer to FIG. 5, in a particular embodiment, the CPU 505 executes a sequence of machine-readable instructions, which can be embodied in a program or software. The instructions can be stored in a memory. The instructions can be directed to the CPU 505, and can subsequently program or otherwise configure the CPU 505 to implement methods of the present disclosure. Examples of operations performed by the CPU 505 can include fetch, decode, execute, and write back. The CPU 505 can be part of a circuit, such as an integrated circuit. One or more other components of the device 501 can be included in the circuit. In some cases, the circuit can be an application specific integrated circuit (ASIC) or a field programmable gate array (FPGA).

Continuing to refer to FIG. 5, the data storage unit 525 can be a data storage unit (or data repository) for storing data, such as payment information, page request information, rebate information, signature information, additional credential information, or any related information. In some aspects, the storage unit 525 can store files, such as drivers, libraries and saved programs. The storage unit 525 can store user data, e.g., user preferences and user programs. The digital processing device 501 in some cases can include one or more additional data storage units that are external, such as located on a remote server that is in communication through an intranet or the Internet.

Methods as described herein can be implemented by way of machine (e.g., computer processor) executable code stored on an electronic storage location of the digital processing device 501, such as, for example, on a memory or data storage unit 525. The machine executable or machine readable code can be provided in the form of software. During use, the code can be executed by the processor 505. In some cases, the code can be retrieved from the data storage unit 525 and stored in memory for ready access by the processor 505. In some situations, the data storage unit 525 can be precluded, and machine-executable instructions can be stored in memory.

Non-Transitory Computer Readable Storage Medium

In some embodiments, the platforms, systems, media, and methods disclosed herein include one or more non-transitory computer readable storage media encoded with a program including instructions executable by the operating system of an optionally networked digital processing device. In further embodiments, a computer readable storage medium is a tangible component of a digital processing device. In still further embodiments, a computer readable storage medium is optionally removable from a digital processing device. In some embodiments, a computer readable storage medium includes, by way of non-limiting examples, CD-ROMs, DVDs, flash memory devices, solid state memory, magnetic disk drives, magnetic tape drives, optical disk drives, cloud computing systems and services, and the like. In some cases, the program and instructions are permanently, substantially permanently, semi-permanently, or non-transitorily encoded on the media.

Computer Program

In some embodiments, the platforms, systems, media, and methods disclosed herein include at least one computer program, or use of the same. A computer program includes a sequence of instructions, executable in the digital processing device's CPU, written to perform a specified task. In some embodiments, computer readable instructions are implemented as program modules, such as functions, objects, Application Programming Interfaces (APIs), data structures, and the like, that perform particular tasks or implement particular abstract data types. In light of the disclosure provided herein, those of skill in the art will recognize that a computer program may be written in various versions of various languages.

In some embodiments, the functionality of the computer readable instructions is combined or distributed as desired in various environments. In some embodiments, a computer program comprises one sequence of instructions. In some embodiments, a computer program comprises a plurality of sequences of instructions. In some embodiments, a computer program is provided from one location. In other embodiments, a computer program is provided from a plurality of locations. In various embodiments, a computer program includes one or more software modules. In various embodiments, a computer program includes, in part or in whole, one or more web applications, one or more mobile applications, one or more standalone applications, one or more web browser plug-ins, extensions, add-ins, or add-ons, or combinations thereof.

Web Application

In some embodiments, a computer program includes a web application. In light of the disclosure provided herein, those of skill in the art will recognize that a web application, in various embodiments, utilizes one or more software frameworks and one or more database systems. In some embodiments, a web application is created upon a software framework such as Microsoft®.NET or Ruby on Rails (RoR). In some embodiments, a web application utilizes one or more database systems including, by way of non-limiting examples, relational, non-relational, object oriented, associative, and XML database systems. In further embodiments, suitable relational database systems include, by way of non-limiting examples, Microsoft® SQL Server, mySQL™, and Oracle®. Those of skill in the art will also recognize that a web application, in various embodiments, is written in one or more versions of one or more languages. In various embodiments, a web application is written in one or more markup languages, presentation definition languages, client-side scripting languages, server-side coding languages, database query languages, or combinations thereof. In some embodiments, a web application is written to some extent in a markup language such as Hypertext Markup Language (HTML), Extensible Hypertext Markup Language (XHTML), or eXtensible Markup Language (XML). In some embodiments, a web application is written to some extent in a presentation definition language such as Cascading Style Sheets (CSS). In some embodiments, a web application is written to some extent in a client-side scripting language such as Asynchronous Javascript and XML (AJAX), Flash® Actionscript, Javascript, or Silverlight®. In some embodiments, a web application is written to some extent in a server-side coding language such as Active Server Pages (ASP), ColdFusion®, Perl, Java™, JavaServer Pages (JSP), Hypertext Preprocessor (PHP), Python™, Ruby, Tcl, Smalltalk, WebDNA®, or Groovy. In some embodiments, a web application is written to some extent in a database query language such as Structured Query Language (SQL). In some embodiments, a web application integrates enterprise server products such as IBM® Lotus Domino®. In some embodiments, a web application includes a media player element. In various further embodiments, a media player element utilizes one or more of many suitable multimedia technologies including, by way of non-limiting examples, Adobe® Flash®, HTML 5, Apple® QuickTime®, Microsoft® Silverlight®, Java™, and Unity®.

Figure 6:
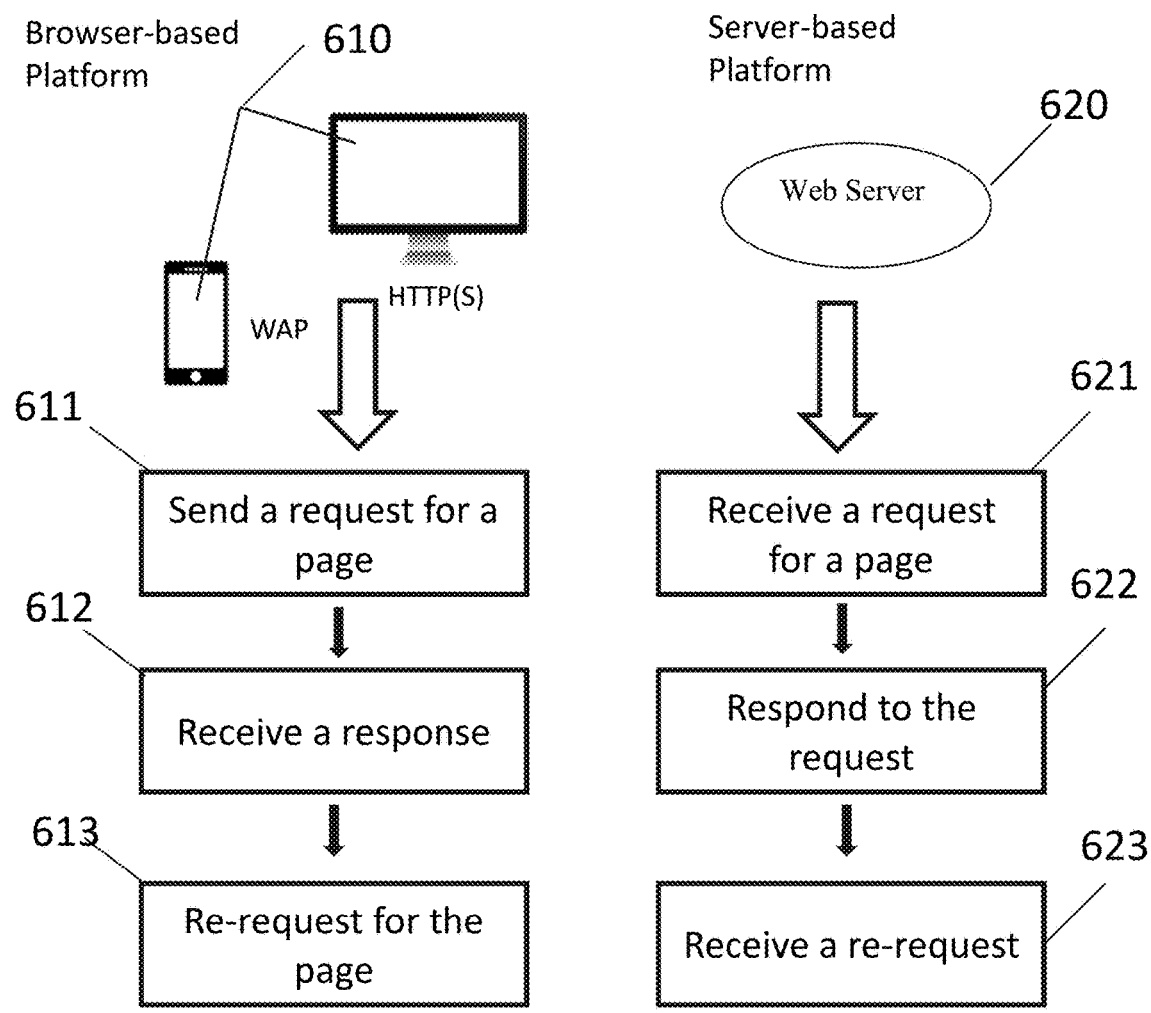
FIG. 6 shows a non-limiting example of a web/mobile system for creating a pay-per-access micropayment-based application; in this case, a system providing browser-based and/or server-based platforms.

Referring to FIG. 6, in a particular embodiment, the application comprises browser-based platform 610. In some embodiments, the browser-based platform 610 comprises at least one processor, an operating system configured to perform executable instructions, a memory, and a computer program including instructions executable by the digital processing device to create a pay-per-access micropayment-based web browsing application. In some aspects, the application comprises request unit 611 for sending a request for a page, response unit 612 for receiving a response for the request, and re-request unit 613 for sending a re-request for the page. In some aspects, the application comprises a web browser or web browser plug-in, extension, or add-on. In further aspects, the application comprises a software module loading the page and inserting ads selected by the browser-user from a service provider. In some aspects, the publisher is compensated for providing the content and the browser-user recovers some or all of the payment.

Continuing to refer to FIG. 6, the request unit 611 can send a request for a page from a browser-user without payment information. In some aspects, the request unit 611 can send a request for a page from browser-user with payment information. In further aspects, the payment information in the request can comprise willingness to pay, a method of payment, one or more sources preferred for recovering money by inserting advertisements, or the amount of the payment. In further aspects, the payment information in the request comprises a micropayment, for example, a micropayment aggregated with other micropayments. The page can comprise content provided by a publisher. The payment can be provided at least in part to the publisher or an entity associated with the publisher. The response can include a redirect URL, a payment request, or rebate information. The re-request unit 613 can send re-request for the page from the browser-user with payment information. In further aspects, the payment information in the re-request can comprise willingness to pay, a method of payment, one or more sources preferred for recovering money by inserting advertisements, or the amount of the payment. In further aspects, the payment information in the re-request comprises a micropayment, for example, a micropayment aggregated with other micropayments. The request unit 611 or the re-request unit 613 can comprise payment information including one or more credentials attesting to the value of the browser-user to the publisher. The application can further comprise a software module confirming the credential with a third party or a software module allowing direct evaluation by the publisher.

Continuing to refer to FIG. 6, in an alternative embodiment, the application comprises a server-based platform 620 that comprises at least one processor, an operating system configured to perform executable instructions, a memory, and a computer program including instructions executable by the digital processing device to create a pay-per-access micropayment-based server application. In some aspects, the application comprises request unit 621 for receiving a request for a page, response unit 622 for sending a response to the request, and re-request unit 623 for receiving a re-request for the page. In some aspects, the request unit 621 can receive a request for a page from a browser-user without payment information. The response can include a redirect URL, a payment request, or rebate information. In some aspects, the request unit 621 can receive a request for a page from browser-user with payment information. In further aspects, the payment information can comprise willingness to pay, a method of payment, one or more sources preferred for recovering money by inserting advertisements, or the amount of the payment. In further aspect, the payment information comprises a micropayment, for example, a micropayment aggregated with other micropayments. The page can comprise content provided by a publisher. The payment can be provided at least in part to the publisher or an entity associated with the publisher. The re-request unit 623 can receive re-request for the page from the browser-user with payment information. In further aspects, the payment information in the re-request can comprise willingness to pay, a method of payment, one or more sources preferred for recovering money by inserting advertisements, or the amount of the payment. In further aspects, the payment information in the re-request comprises a micropayment, for example, a micropayment aggregated with other micropayments. The request unit 621 or the re-request unit 623 can comprise receipt of payment information including one or more credentials attesting to the value of the browser-user to the publisher. The application can further comprise a software module confirming the credential with a third party or a software module allowing direct evaluation by the publisher.

Figure 7:
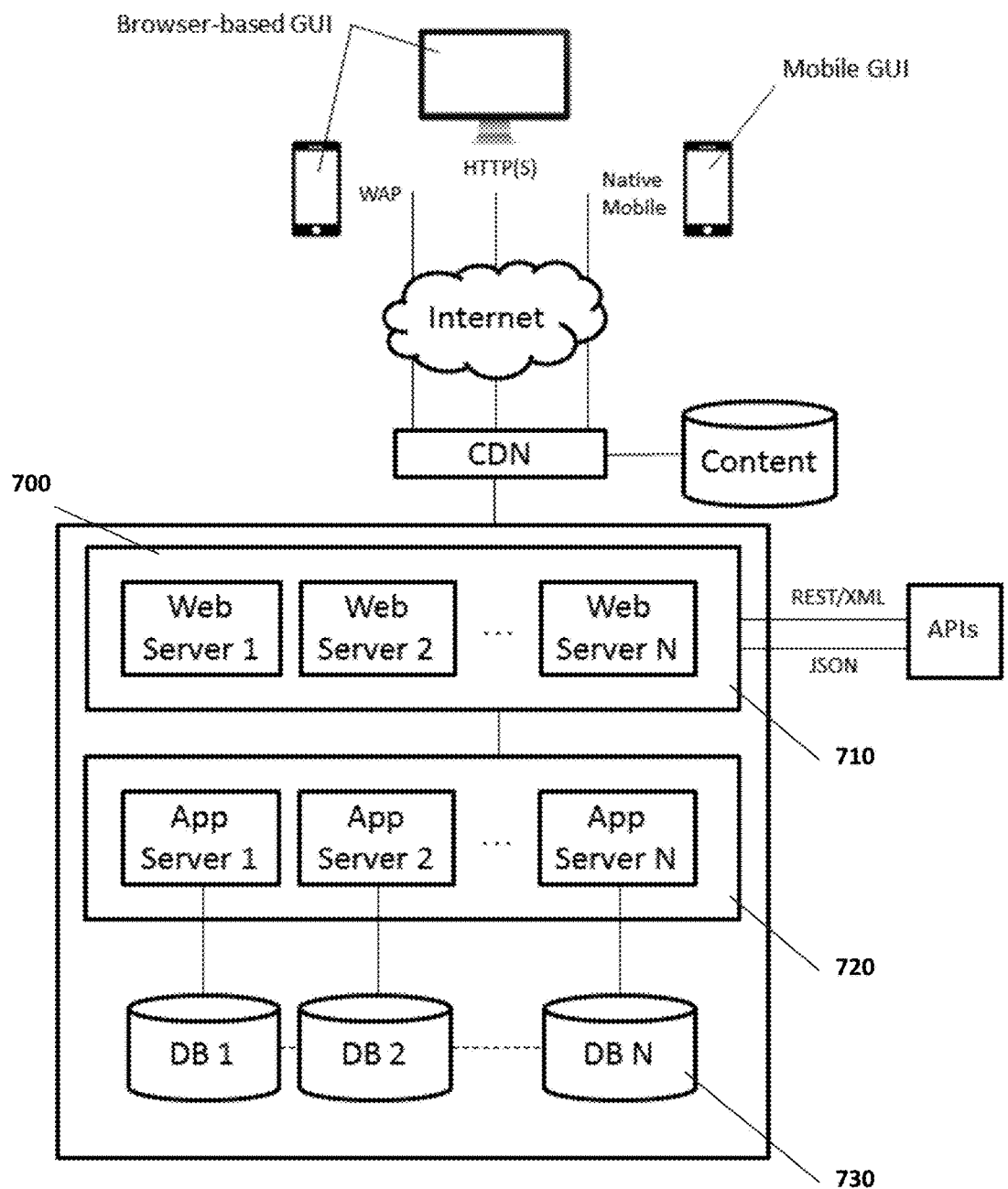
FIG. 7 shows a non-limiting example of a cloud-based web/mobile system for creating a pay-per-access micropayment-based application; in this case, a system comprising an elastically load balanced, auto-scaling web server and application server resources as well synchronously replicated databases.

Referring to FIG. 7, in a particular embodiment, the application has a distributed, cloud-based architecture 700 and comprises elastically load balanced, auto-scaling web server resources 710 and application server resources 720 as well synchronously replicated databases 730 to create a pay-per-access micropayment-based server application or web browsing application.

Additional Variations of Implementations

Figure 8:
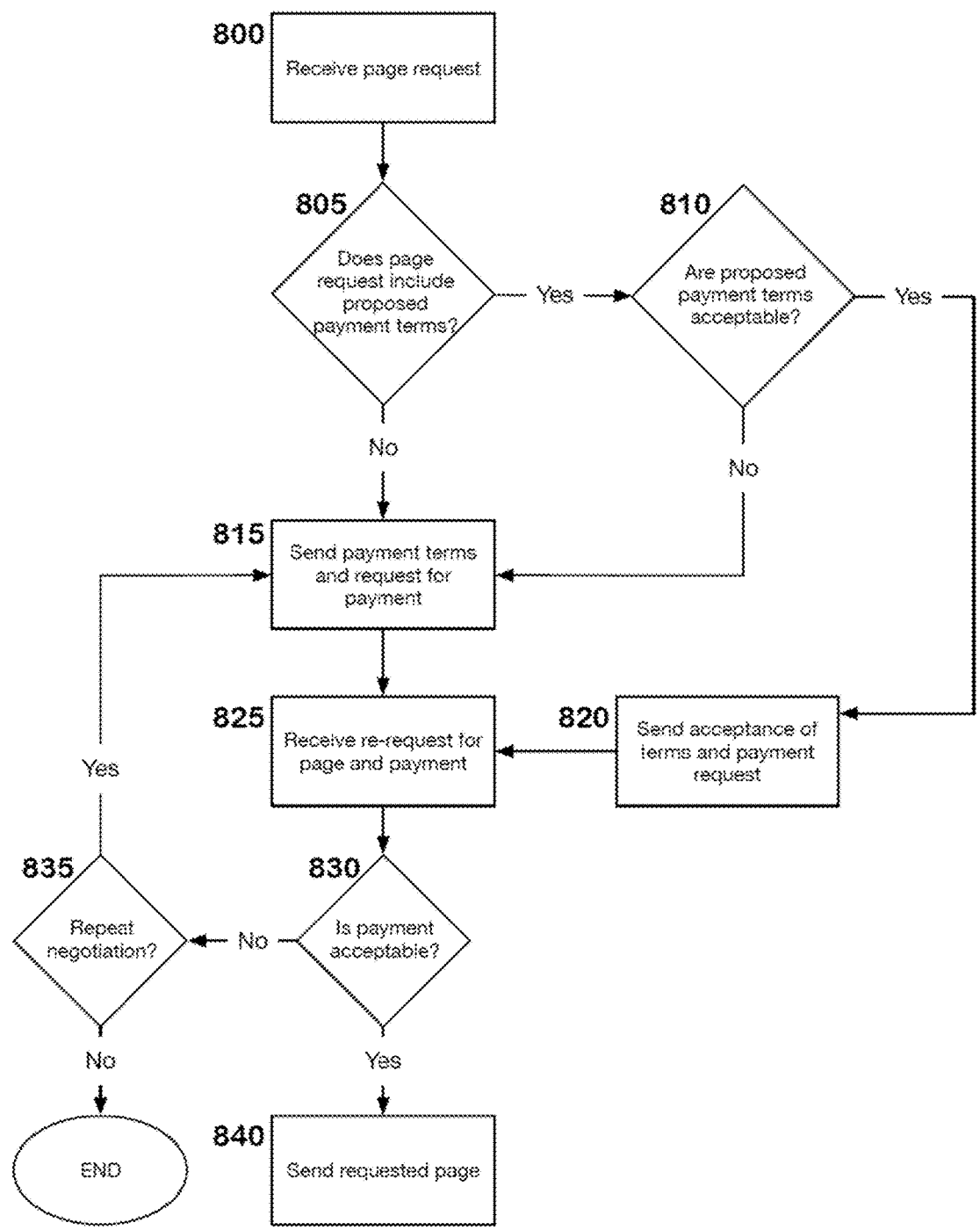
FIG. 8 shows a non-limiting example of a process flow diagram; in this case, a diagram including steps for creating a pay-per-access micropayment-based server application.

Referring to FIG. 8, in a particular embodiment, a web server receives a request for content from a browser-user at step 800. At step 805 the web server determines whether the page request includes proposed payment terms from the browser-user. If the page request does not include payment terms, then at step 815 the web server refuses the page request and issues payment terms and a request for payment to the browser-user. At step 825 the web server receives the browser-user's re-request for the page along with acceptance of the payment terms and proposed payment. The web server then examines the proffered payment and the acceptance to determine whether they satisfy the requirements from step 815. If the browser-user's re-request satisfies the web server's payment terms and payment, then at step 840 the web server sends the requested page to the browser-user.

Continuing with FIG. 8, if the web server determines at step 805 that the browser-user included proposed payment terms along with the page request, the web server then examines those terms at step 810. If the web server does not find those terms acceptable, then it proceeds to step 815, refusing the page request and proposing new payment terms and requesting payment. If the web server determines at step 805 that the browser-user's payment terms are acceptable, then the web server responds with acceptance of the browser-user's payment terms and requests payment. The web server then receives a re-request for the page along with payment from the browser-user at step 825.

Continuing with FIG. 8, if the web server determines at step 830 that the browser-user's proffered payment is not acceptable, the web server then determines whether to continue negotiation with the browser-user at step 835. If the web server determines to continue negotiation, it proceeds to step 815, sending payment terms and a request for payment to the browser-user. If the web server determines at step 835 not to continue negotiation with the browser-user, then the web server ends the negotiation.

Figure 9:
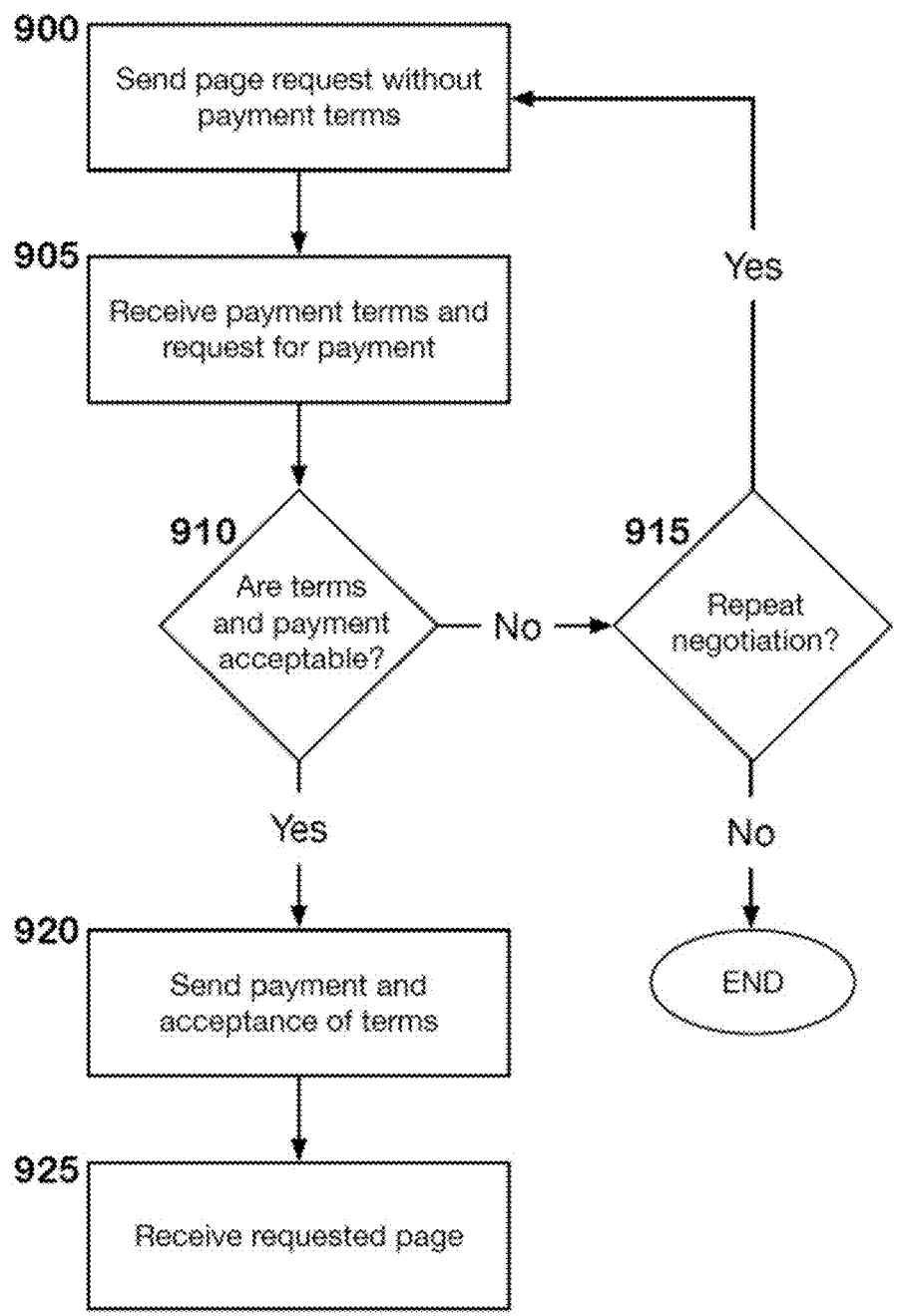
FIG. 9 shows a non-limiting example of a process flow diagram; in this case, a diagram including steps for creating a pay-per-access micropayment-based web browsing application.

Referring to FIG. 9, in a particular embodiment, a browser-user sends a page request to a web server at step 900, the page request not including any payment terms. At step 905 the browser-user receives the web server response denying the page request and including payment terms and a request for payment. At step 910 the browser-user determines whether the payment terms and the request payment are acceptable. If the payment terms and request for payment are acceptable, the browser-user proceeds to step 920 and re-requests the page, including acceptance of the payment terms and proffering payment. The browser-user then receives the requested page at step 925.

Continuing with FIG. 9, at step 910, if the browser-user determines that the payment terms or request for payment is not acceptable, the browser user proceeds to step 915 to determine whether to continue the negotiation. If the browser-user determines to continue the negotiation, it returns to step 900 and sends a page request to the web server, the request not including payment terms. If the browser-user determines not to continue the negotiation at step 915, then the browser ends the negotiation.

Figure 10:
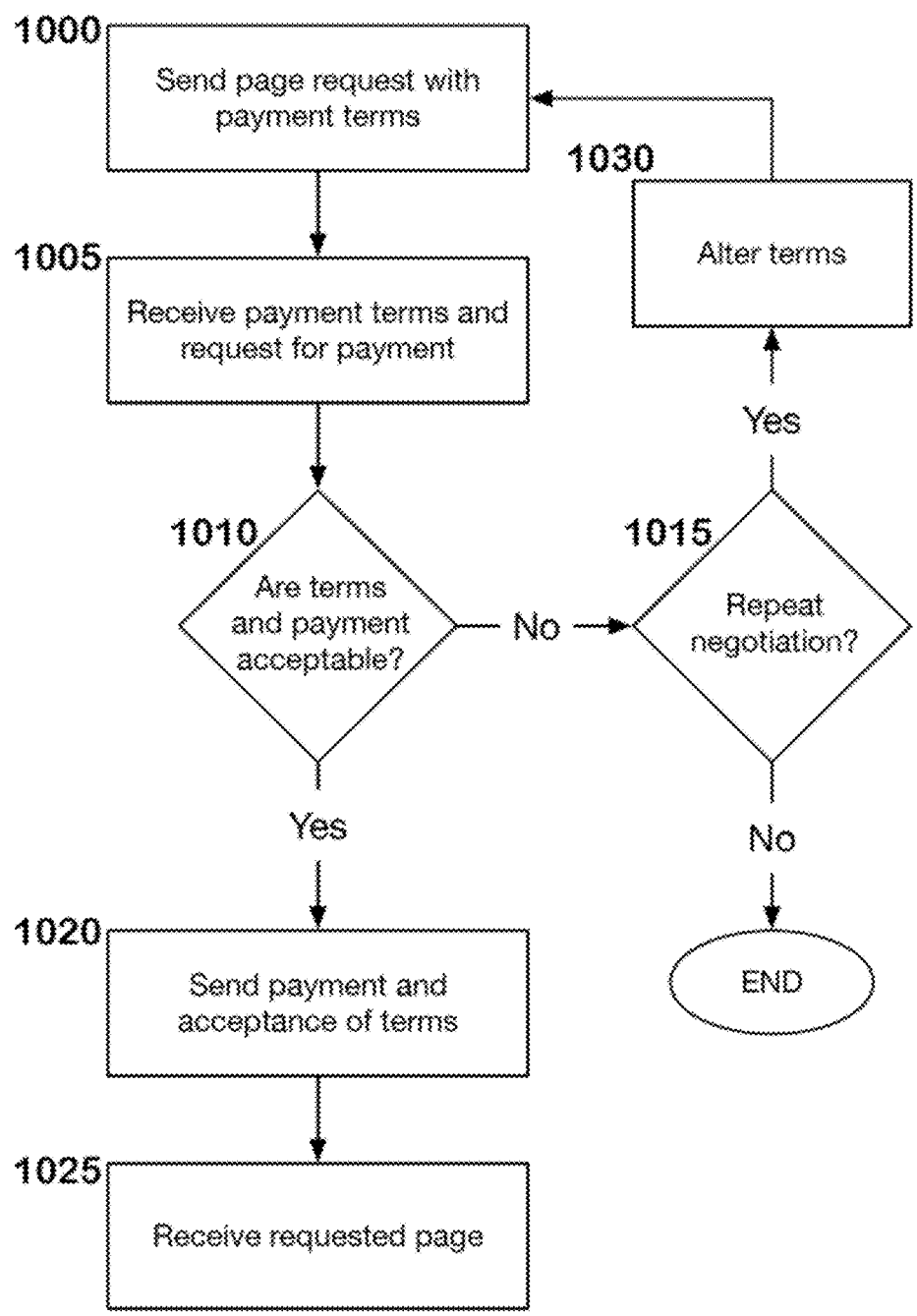
FIG. 10 shows a non-limiting example of a process flow diagram; in this case, a diagram including steps for creating a pay-per-access micropayment-based web browsing application.

Referring to FIG. 10, in a particular embodiment, a browser-user sends a page request to a web server at step 1000, the page request including proposed payment terms. At step 1005 the browser-user receives the web server response denying the page and including a request for payment and, optionally, modified payment terms. At step 1010 the browser-user determines whether to accept the request for payment (and, optionally, payment terms proposed by the web server). If the browser-user accepts the payment request, then at step 1020 the browser-user sends a re-request for the page along with the payment to the web server. The browser-user then receives the requested page at step 1025.

Continuing with FIG. 10, if the browser-user determines at step 1010 that the payment terms or the payment request is not acceptable, then at step 1015 the browser-user determines whether to continue negotiation with the web server. If the browser-user determines to continue negotiation, it optionally amends its proposed payment terms at step 1030 before returning to step 1000 to send a page request with payment terms to the web server. If the browser-user determines not to continue negotiation with the web server at step 1015, the browser-user ends the negotiation.

Mobile Application

In some embodiments, a computer program includes a mobile application provided to a mobile digital processing device. In some embodiments, the mobile application is provided to a mobile digital processing device at the time it is manufactured. In other embodiments, the mobile application is provided to a mobile digital processing device via the computer network described herein.

In view of the disclosure provided herein, a mobile application is created by techniques known to those of skill in the art using hardware, languages, and development environments known to the art. Those of skill in the art will recognize that mobile applications are written in several languages. Suitable programming languages include, by way of non-limiting examples, C, C++, C#, Objective-C, Java™, Javascript, Pascal, Object Pascal, Python™, Ruby, VB.NET, WML, and XHTML/HTML with or without CSS, or combinations thereof.

Suitable mobile application development environments are available from several sources. Commercially available development environments include, by way of non-limiting examples, AirplaySDK, alcheMo, Appcelerator®, Celsius, Bedrock, Flash Lite, .NET Compact Framework, Rhomobile, and WorkLight Mobile Platform. Other development environments are available without cost including, by way of non-limiting examples, Lazarus, MobiFlex, MoSync, and Phonegap. Also, mobile device manufacturers distribute software developer kits including, by way of non-limiting examples, iPhone and iPad (iOS) SDK, Android™ SDK, BlackBerry® SDK, BREW SDK, Palm® OS SDK, Symbian SDK, webOS SDK, and Windows® Mobile SDK.

Those of skill in the art will recognize that several commercial forums are available for distribution of mobile applications including, by way of non-limiting examples, Apple® App Store, Google® Play, Chrome WebStore, BlackBerry® App World, App Store for Palm devices, App Catalog for webOS, Windows® Marketplace for Mobile, Ovi Store for Nokia® devices, Samsung® Apps, and Nintendo® DSi Shop.

Standalone Application

In some embodiments, a computer program includes a standalone application, which is a program that is run as an independent computer process, not an add-on to an existing process, e.g., not a plug-in. Those of skill in the art will recognize that standalone applications are often compiled. A compiler is a computer program(s) that transforms source code written in a programming language into binary object code such as assembly language or machine code. Suitable compiled programming languages include, by way of non-limiting examples, C, C++, Objective-C, COBOL, Delphi, Eiffel, Java™, Lisp, Python™, Visual Basic, and VB .NET, or combinations thereof. Compilation is often performed, at least in part, to create an executable program. In some embodiments, a computer program includes one or more executable complied applications.

Web Browser Plug-in

In some embodiments, the computer program includes a web browser plug-in (e.g., extension, etc.). In computing, a plug-in is one or more software components that add specific functionality to a larger software application. Makers of software applications support plug-ins to enable third-party developers to create abilities which extend an application, to support easily adding new features, and to reduce the size of an application. When supported, plug-ins enable customizing the functionality of a software application. For example, plug-ins are commonly used in web browsers to play video, generate interactivity, scan for viruses, and display particular file types. Those of skill in the art will be familiar with several web browser plug-ins including, Adobe® Flash® Player, Microsoft® Silverlight®, and Apple® QuickTime®. In some embodiments, the toolbar comprises one or more web browser extensions, add-ins, or add-ons. In some embodiments, the toolbar comprises one or more explorer bars, tool bands, or desk bands.

In view of the disclosure provided herein, those of skill in the art will recognize that several plug-in frameworks are available that enable development of plug-ins in various programming languages, including, by way of non-limiting examples, C++, Delphi, Java™, PHP, Python™, and VB .NET, or combinations thereof.

Web browsers (also called Internet browsers) are software applications, designed for use with network-connected digital processing devices, for retrieving, presenting, and traversing information resources on the World Wide Web. Suitable web browsers include, by way of non-limiting examples, Microsoft® Internet Explorer®, Mozilla® Firefox®, Google® Chrome, Apple® Safari®, Opera Software® Opera®, and KDE Konqueror. In some embodiments, the web browser is a mobile web browser. Mobile web browsers (also called mircrobrowsers, mini-browsers, and wireless browsers) are designed for use on mobile digital processing devices including, by way of non-limiting examples, handheld computers, tablet computers, netbook computers, subnotebook computers, smartphones, music players, personal digital assistants (PDAs), and handheld video game systems. Suitable mobile web browsers include, by way of non-limiting examples, Google® Android® browser, RIM BlackBerry® Browser, Apple® Safari®, Palm® Blazer, Palm® WebOS® Browser, Mozilla® Firefox® for mobile, Microsoft® Internet Explorer® Mobile, Amazon® Kindle® Basic Web, Nokia® Browser, Opera Software® Opera® Mobile, and Sony® PSP™ browser.

Software Modules

In some embodiments, the platforms, systems, media, and methods disclosed herein include software, server, and/or database modules, or use of the same. In view of the disclosure provided herein, software modules are created by techniques known to those of skill in the art using machines, software, and languages known to the art. The software modules disclosed herein are implemented in a multitude of ways. In various embodiments, a software module comprises a file, a section of code, a programming object, a programming structure, or combinations thereof. In further various embodiments, a software module comprises a plurality of files, a plurality of sections of code, a plurality of programming objects, a plurality of programming structures, or combinations thereof. In various embodiments, the one or more software modules comprise, by way of non-limiting examples, a web application, a mobile application, and a standalone application. In some embodiments, software modules are in one computer program or application. In other embodiments, software modules are in more than one computer program or application. In some embodiments, software modules are hosted on one machine. In other embodiments, software modules are hosted on more than one machine. In further embodiments, software modules are hosted on cloud computing platforms. In some embodiments, software modules are hosted on one or more machines in one location. In other embodiments, software modules are hosted on one or more machines in more than one location.

Databases

In some embodiments, the platforms, systems, media, and methods disclosed herein include one or more databases, or use of the same. In view of the disclosure provided herein, those of skill in the art will recognize that many databases are suitable for storage and retrieval of publisher, advertiser, user, and micropayment information. In various embodiments, suitable databases include, by way of non-limiting examples, relational databases, non-relational databases, object oriented databases, object databases, entity-relationship model databases, associative databases, and XML databases. Further non-limiting examples include SQL, PostgreSQL, MySQL, Oracle, DB2, and Sybase. In some embodiments, a database is internet-based. In further embodiments, a database is web-based. In still further embodiments, a database is cloud computing-based. In other embodiments, a database is based on one or more local computer storage devices.

What is claimed is:

1. A computer-implemented system, comprising: a digital processing device comprising at least one processor, an operating system configured to perform executable instructions, a memory, and a computer program including instructions executable by the digital processing device to implement an automated negotiated exchange for providing micropayment-based access to a web page in response to a request, the computer program comprising:
  (a) a first software module receiving the request for access to the web page from a browser-user, the first software module determining that the request was made without payment information, the web page comprising content provided by a publisher;
  (b) a second software module
    (1) determining the value of the browser-user to an advertising source;
    (2) determining a price the browser-user must pay for accessing the web page and the amount of a rebate to be paid to the browser-user to accept advertising from the advertising source, the price for accessing the web page and the rebate based upon the value of the browser-user to the advertising source; and
    (3) responding to the request for access to the web page from the browser-user, the response comprising: (i) a refusal of access to the web page, and (ii) a provision of payment terms, the payment terms comprising the price for accessing the web page and the rebate; and
  (c) a third software module
    (1) receiving a re-request for the web page from the browser-user, the re-request comprising an amount of a micropayment the browser-user is willing to pay to access the web page, wherein the browser-user is configured to automatically (i) determine the amount of the micropayment based upon the price and the rebate and (ii) send the re-request in reply to the response;
    (2) determining whether the micropayment is sufficient to satisfy the price for accessing the web page; and
    (3) sending the requested web page to the browser-user if the micropayment satisfies the price for accessing the web page; wherein the micropayment is provided at least in part to the publisher or an entity associated with the publisher.

2. The system of claim 1, further comprising a fourth software module aggregating the micropayment with a plurality of other micropayments.

3. The system of claim 1, wherein the third software module serving the page inserts an advertisement permitted by the browser-user from an advertising source.

4. The system of claim 1, wherein the re-request comprises willingness to pay, a method of payment, one or more sources preferred for recovering money by inserting advertisements, or the amount of the micropayment.

5. The system of claim 1, wherein the re-request further comprises one or more credentials attesting to the value of the browser-user to the publisher.

6. The system of claim 1, wherein the micropayment is in cryptocurrency.

7. The system of claim 5, further comprising a fifth software module confirming the credentials.

8. A computer-implemented method of implementing an automated negotiated exchange for providing micropayment-based access to a web page in response to a request, the method comprising:
   (a) receiving a request for access to the web page from a browser-user, the web page comprising content provided by a publisher;
   (b) determining that the request for the web page was made without payment information;
   (c) determining the value of the browser-user to an advertising source;
   (d) determining a price the browser-user must pay for accessing the web page and the amount of a rebate to be paid to the browser-user to accept advertising from the advertising source, the price for accessing the web page and the rebate based upon the value of the browser-user to the advertising source;
   (e) responding to the request for access to the web page from the browser-user, the response comprising: a (i) refusal of access to the web page and (ii) a provision of payment terms, the payment terms comprising the price to access the web page and the rebate;
   (f) receiving a re-request for the web page from the browser-user, the re-request comprising an amount of a micropayment the browser-user is willing to pay to access the web page, wherein the browser-user is configured to automatically (i) determine the amount of the micropayment based upon the price and the rebate and (ii) send the re-request in reply to the response;
   (g) determining whether the micropayment is sufficient to satisfy the price for accessing the web page; and
   (h) sending the requested web page to the browser-user if the micropayment satisfies the price for accessing the web page; wherein the micropayment is provided at least in part to the publisher or an entity associated with the publisher.

9. The method of claim 8, wherein the method further comprises aggregating the micropayment with a plurality of other micropayments.

10. The method of claim 8, wherein the method further comprises serving the page and inserting an advertisement permitted by the browser-user from an advertising source.

11. The method of claim 8, wherein the re-request comprises willingness to pay, a method of payment, one or more sources preferred for recovering money by inserting advertisements, or the amount of the micropayment.

12. The method of claim 8, wherein the re-request further comprises one or more credentials attesting to the value of the browser-user to the publisher.

13. The method of claim 8, wherein the micropayment is in cryptocurrency.

14. The method of claim 12, wherein the method further comprises confirming the credentials.

15. A computer-implemented system, comprising: a digital processing device comprising at least one processor, an operating system configured to perform executable instructions, a memory, and a computer program including instructions executable by the digital processing device to implement an automated negotiated exchange for providing micropayment-based access to a web page in response to a request, the computer program comprising:
   (a) a first software module receiving a request for access to the web page from a browser-user, the first software module determining that the request was made with payment information comprising willingness to pay, a method of payment, one or more sources preferred for recovering money by inserting advertisements, or the amount of a micropayment, the web page comprising content provided by a publisher, the micropayment to be provided at least in part to the publisher or an entity associated with the publisher;
   (b) a second software module
      (1) determining the value of the browser-user to an advertising source;
      (2) determining a price the browser-user must pay for accessing the web page and the amount of a rebate to be paid to the browser-user to accept advertising from the advertising source, the price for accessing the web page and the rebate based upon the value of the browser user to the advertising source; and
      (3) responding to the request for access to the web page from the browser-user, the response comprising: (i) a refusal of access to the web page and a provision of payment terms, the payment terms comprising the price for access to the web page and the rebate; or (ii) an acceptance of the browser-user's payment terms and a request for payment; and
   (c) a third software module
      (1) receiving a re-request for the web page from the browser-user, the re-request comprising an amount of a micropayment the browser-user is willing to pay, wherein the browser-user is configured to automatically (i) determine the amount of the micropayment based upon the price and the rebate and (ii) send the re-request in reply to the response;
      (2) determining whether the micropayment is sufficient to satisfy the price for accessing the web page; and
      (3) sending the requested web page to the browser-user if the micropayment satisfies the price for accessing the web page; wherein the micropayment is provided at least in part to the publisher or an entity associated with the publisher.

16. The system of claim 15, wherein the payment information in the request comprises the amount of a micropayment.

17. The system of claim 15, further comprising a fourth software module aggregating the micropayment with a plurality of other micropayments.

18. The system of claim 15, wherein the payment information in the request or the re-request further comprises one or more credentials attesting to the value of the browser-user to the publisher.

19. The system of claim 18, further comprising a fifth software module confirming the credentials.

20. The system of claim 15, wherein the third software module serving the page inserts an advertisement permitted by the browser-user from an advertising source.

21. The system of claim 15, wherein the micropayment is in cryptocurrency.

22. A computer-implemented method of implementing an automated negotiated exchange for providing micropayment-based access to a web page in response to a request, the method comprising:
(a) receiving a request for access to the web page from a browser-user, the web page comprising content provided by a publisher;
(b) determining that the request for the web page was made with payment information comprising willingness to pay, a method of payment, one or more sources preferred for recovering money by inserting advertisements, or the amount of a micropayment, the micropayment to be provided at least in part to the publisher or an entity associated with the publisher;
(c) determining the value of the browser-user to an advertising source;
(d) determining a price the browser-user must pay for accessing the web page and the amount of a rebate to be paid to the browser-user to accept advertising from the advertising source; the price to access the web page and the rebate based upon the value of the browser-user to the advertising source;
(e) responding to the request for access to the web page from the browser-user, the response comprising: (i) a refusal of access to the web page and a provision of payment terms, the payment terms comprising the price for access to the web page and the rebate; or (ii) an acceptance of the browser-user's payment terms and a request for payment; and
(f) receiving a re-request for the web page from the browser-user, the re-request comprising an amount of a micropayment the browser-user is willing to pay to access the web page, wherein the browser-user is configured to automatically (i) determine the amount of the micropayment based upon the price and the rebate and (ii) send the re-request in reply to the response;
(g) determining whether the micropayment is sufficient to satisfy the price for accessing the web page; and
(h) sending the requested web page to the browser-user if the micropayment satisfies the price for accessing the web page; wherein the micropayment is provided at least in part to the publisher or an entity associated with the publisher.

23. The method of claim 22, wherein the payment information in the request comprises the amount of a micropayment.

24. The method of claim 22, wherein the method further comprises aggregating the micropayment with a plurality of other micropayments.

25. The method of claim 22, wherein the payment information in the request or the re-request further comprises one or more credentials attesting to the value of the browser-user to the publisher.

26. The method of claim 25, wherein the method further comprises confirming the credentials.

27. The method of claim 22, wherein the method further comprises serving the page and inserting an advertisement permitted by the browser-user from an advertising source.

28. The method of claim 22, wherein the micropayment is in cryptocurrency.

* * * * *